United States Patent
Dingle et al.

(10) Patent No.: US 10,107,164 B2
(45) Date of Patent: Oct. 23, 2018

(54) REAGENT DOSING SYSTEM AND METHOD OF DOSING REAGENT

(71) Applicant: DELPHI TECHNOLOGIES IP LIMITED, St. Michael (BB)

(72) Inventors: Philip J. G. Dingle, Rochester, MI (US); Martin Paul Hardy, Gillingham (GB); Roman Stefan Zuelch, Heilbronn (DE)

(73) Assignee: DELPHI TECHNOLOGIES IP LIMITED (BB)

( * ) Notice: Subject to any disclaimer, the term of this patent is extended or adjusted under 35 U.S.C. 154(b) by 9 days.

(21) Appl. No.: 15/006,608

(22) Filed: Jan. 26, 2016

(65) Prior Publication Data

US 2016/0138452 A1    May 19, 2016

Related U.S. Application Data

(63) Continuation of application No. 14/320,871, filed on Jul. 1, 2014, now Pat. No. 9,279,351, and a (Continued)

(30) Foreign Application Priority Data

Jun. 6, 2008    (GB) .................................. 0810382.2

(51) Int. Cl.
*F01N 3/00* (2006.01)
*F01N 3/10* (2006.01)
(Continued)

(52) U.S. Cl.
CPC ............. *F01N 3/208* (2013.01); *F01N 3/021* (2013.01); *F01N 3/035* (2013.01); *F01N 3/0807* (2013.01);
(Continued)

(58) Field of Classification Search
CPC ...... F01N 11/00; F01N 13/011; F01N 13/009; F01N 2240/25; F01N 2240/36;
(Continued)

(56) References Cited

U.S. PATENT DOCUMENTS

| | | | |
|---|---|---|---|
| 5,189,876 | A | 3/1993 | Hirota et al. |
| 5,809,774 | A | 9/1998 | Peter-Hoblyn et al. |

(Continued)

FOREIGN PATENT DOCUMENTS

| | | |
|---|---|---|
| DE | 19843960 | 3/2000 |
| DE | 10323607 | 12/2004 |

(Continued)

*Primary Examiner* — Phutthiwat Wongwian
*Assistant Examiner* — Diem Tran
(74) *Attorney, Agent, or Firm* — Joshua M. Haines

(57) ABSTRACT

A reagent dosing system for dosing a reagent into the exhaust gas stream of an internal combustion engine includes a reagent tank for storing a supply of reagent; an injector module including an atomizing dispenser and a positive-displacement metering pump which draws reagent from the reagent tank and delivers it to the dispenser; a supply line coupling the reagent tank to the injector module; a dosing control unit operable to control the injector module to inject reagent into the exhaust gas stream; and an additional priming pump arranged, in use, to urge reagent along the supply line toward the injector module under selected conditions.

4 Claims, 18 Drawing Sheets

Related U.S. Application Data continuation of application No. 12/473,648, filed on May 28, 2009, now Pat. No. 8,899,021.

(51) Int. Cl.
| | | |
|---|---|---|
| *F01N 3/20* | (2006.01) | |
| *F01N 3/021* | (2006.01) | |
| *F01N 3/035* | (2006.01) | |
| *F01N 3/08* | (2006.01) | |
| *F01N 11/00* | (2006.01) | |
| *F01N 13/00* | (2010.01) | |

(52) U.S. Cl.
CPC .......... *F01N 3/0814* (2013.01); *F01N 3/106* (2013.01); *F01N 11/00* (2013.01); *F01N 13/009* (2014.06); *F01N 13/011* (2014.06); *F01N 3/0878* (2013.01); *F01N 2240/25* (2013.01); *F01N 2240/36* (2013.01); *F01N 2250/02* (2013.01); *F01N 2250/12* (2013.01); *F01N 2250/14* (2013.01); *F01N 2260/024* (2013.01); *F01N 2410/04* (2013.01); *F01N 2410/12* (2013.01); *F01N 2560/021* (2013.01); *F01N 2560/026* (2013.01); *F01N 2570/14* (2013.01); *F01N 2610/02* (2013.01); *F01N 2610/03* (2013.01); *F01N 2610/146* (2013.01); *F01N 2610/1413* (2013.01); *F01N 2610/1433* (2013.01); *F01N 2900/0412* (2013.01); *F01N 2900/08* (2013.01); *F01N 2900/1814* (2013.01); *Y02A 50/2344* (2018.01); *Y02T 10/24* (2013.01); *Y02T 10/47* (2013.01)

(58) Field of Classification Search
CPC ............. F01N 2610/02; F01N 2610/03; F01N 2610/1413; F01N 2610/1433; F01N 2610/146
USPC ........................... 60/286, 297, 301, 303, 311
See application file for complete search history.

(56) References Cited

U.S. PATENT DOCUMENTS

| | | |
|---|---|---|
| 6,293,097 B1 | 9/2001 | Wu et al. |
| 6,502,391 B1 | 1/2003 | Hirota et al. |
| 6,745,560 B2 | 6/2004 | Stroia et al. |
| 7,143,578 B2 | 12/2006 | Kakwani et al. |
| 7,415,819 B2 | 8/2008 | Ruona |
| 7,511,920 B2 | 3/2009 | Byun et al. |
| 7,654,080 B2 | 2/2010 | Ripper et al. |
| 7,673,446 B2 | 3/2010 | Zemskova et al. |
| 7,832,200 B2* | 11/2010 | Kesse ................. F01N 3/106 60/274 |
| 8,136,345 B2 | 3/2012 | Liu et al. |
| 8,161,730 B2 | 4/2012 | Chi et al. |
| 2002/0069642 A1 | 6/2002 | Dolling et al. |
| 2004/0006975 A1 | 1/2004 | Stroia et al. |
| 2005/0247048 A1 | 11/2005 | Schaller et al. |
| 2006/0130458 A1 | 6/2006 | Solbrig |
| 2006/0213187 A1 | 9/2006 | Kupe et al. |
| 2007/0074506 A1 | 4/2007 | Driscoll et al. |
| 2007/0113544 A1 | 5/2007 | Nishina et al. |
| 2007/0163232 A1 | 7/2007 | Ueno |
| 2007/0271908 A1 | 11/2007 | Hemingway et al. |
| 2008/0103684 A1 | 5/2008 | Allmer et al. |
| 2008/0124264 A1 | 5/2008 | Ikeda et al. |
| 2009/0205323 A1 | 8/2009 | Tsujimoto et al. |
| 2009/0288395 A1 | 11/2009 | Haeberer et al. |

FOREIGN PATENT DOCUMENTS

| | | |
|---|---|---|
| DE | 102006022582 | 11/2007 |
| EP | 1331373 | 7/2003 |
| FR | 2 790 789 | 9/2000 |
| FR | 2 839 743 | 11/2003 |
| GB | 2 304 821 | 3/1997 |
| JP | 2003-328744 | 11/2003 |
| JP | 2005-113708 | 4/2005 |
| JP | 2005-273614 | 10/2005 |
| JP | 2007-066502 | 3/2007 |
| JP | 2007-071141 | 3/2007 |
| JP | 2008-157188 | 7/2008 |
| WO | 2001-51178 | 7/2001 |
| WO | 2002-32552 | 4/2002 |
| WO | 2005-024232 | 3/2005 |
| WO | 2006-050547 | 5/2006 |
| WO | 2007-071263 | 6/2007 |
| WO | 2008-006840 | 1/2008 |
| WO | 2008-009974 | 1/2008 |
| WO | 2008-013298 | 1/2008 |
| WO | 2008-031421 | 3/2008 |
| WO | 2008-058896 | 5/2008 |

* cited by examiner

REAGENT DOSING SYSTEM AND METHOD OF DOSING REAGENT

CROSS-REFERENCE TO RELATED APPLICATIONS

This application is a continuation application of U.S. patent application Ser. No. 14/320,871 filed on Jul. 1, 2014 which is a continuation application of U.S. Pat. No. 8,899,021 granted on Dec. 2, 2014, the disclosures of which are incorporated herein by reference in their entirety.

TECHNICAL FIELD

The present invention relates to a reagent dosing system for dosing a reagent into the exhaust gas stream of an internal combustion engine and to a method of dosing a reagent into the exhaust gas stream of an internal combustion engine.

BACKGROUND TO THE INVENTION

It is well known that internal combustion engines can produce harmful chemical species in their exhaust streams. It is therefore desirable to eliminate or at least reduce such pollutants to levels low enough that human health is not adversely affected. As a result of the high temperatures that are reached during a combustion event, many chemical species are produced from the oxidation of hydrocarbon fuels, including the oxides of nitrogen (NO and $NO_2$, collectively referred to as $NO_x$). Due to their impact on human health, many countries in the global community have enacted legislation that seeks to limit the emission of NOx from both mobile and stationary sources, and many techniques have been developed to achieve this objective. Among these, the use of catalysis technology has been found to be particularly effective and economically viable, however, it should be noted that different approaches are needed when treating the oxygen-rich exhaust streams from so-called "lean" combustion than is the case for stoichiometric combustion exhaust streams. Examples of lean combustion NOx sources include the compression ignition or diesel engine and the direct-injected lean-burn spark ignition or gasoline engine.

Lean-burn engines are unable to take advantage of the well developed and effective 3-way catalyst systems that are universally used by homogeneous spark ignition engines. Accordingly, the remediation of NOx for lean-burn engines requires the addition of a reductant in conjunction with a suitable catalyst. The reduction of NOx requires near real-time dosing control since NOx production closely follows engine load but is moderated by the amount of ammonia already stored on the catalyst. Accordingly, the reductant dosing schedule is a highly dynamic activity.

Under steady state operating conditions, with a warmed-up engine/catalyst system, it is relatively easy to match the reductant dosing rate to the engine NOx production rate and thereby achieve very high conversion ratios of about 98%. However, under transient operating conditions, achieving this match is much more challenging due to catalyst temperature variation and NH3 storage effects such that conversion ratios of 85 to 90% are more typically achieved. Therefore, quantitative accuracy in dosing and responsiveness to load changes are key requirements for such a system.

One very effective technology for the remediation of NOx in an oxygen-rich exhaust stream is the technique widely known as Selective Catalytic Reduction (hereafter referred to as SCR). In this approach, an ammonia-containing reagent (or reductant) is injected into an exhaust stream at a rate closely related to the instantaneous NOx content of that stream wherein the ammonia ($NH_3$) reacts with the NOx in conjunction with a vanadia-based or similar catalyst such that the pollutant is converted to harmless nitrogen ($N_2$) and water in the tail gas. Both selective catalytic reduction and selective non-catalytic reduction (SNCR) have been used extensively in the industrial sector, and SCR systems have recently been subject to development for mobile emission sources.

Notwithstanding the above, existing SCR dosing systems have a variety of shortcomings.

In prior art systems, a pressurizing pump is located in or near the tank module in order to supply reductant at a fixed known pressure to a remote injector nozzle adjacent the SCR catalyst. This system operates according to a so-called pressure/time metering principle whereby reagent metering is achieved by exposing the control orifice to the controlled pressure for a known time duration. In order to achieve the necessary stability of pressure control in such a system requires sophistication, and therefore expense. Moreover, metering accuracy is dependant on stability of the atomizing nozzle flow area which, due to its location in the hot exhaust environment, is susceptible to change due to crystallized urea deposit build-up.

Many known systems utilise return flow architectures whereby surplus reagent above and beyond that which is needed for SCR dosing is supplied to the nozzle purely for cooling purposes, whence it is returned through a separate duct back to the storage tank. Additionally, such systems may require a purge feature which is activated on engine shut-down which minimizes the propensity for nozzle clogging from salt precipitates due to heat soak-back into the nozzle assembly from the hot exhaust. In such cases, a separate purge pump is required and, since the purge is carried out after the engine is switched off, the purge pump causes an undesirable drain on the vehicle battery.

Examples of existing dosing systems having these features are described in WO 2006/050547 (Pankl Emission Control Systems) and WO 2008/006840 (Inergy Automotive Systems Research).

Positive displacement pumps for reagent dosing are known in the prior art, for example in WO 2005/024232 (Hydraulic Ring), WO 2007/071263 (Grundfos) and WO 2008/031421 (Thomas-Magnete). However, such pumps have been designed to operate at undesirably low pressures and, because the pumping plunger is separated from the reagent by a flexible diaphragm, the accuracy of reagent volumetric quantity metering is also of a much lower order than can be achieved by a piston pump.

It is an object of the present invention to provide an SCR dosing system which substantially overcomes or mitigates the aforementioned problems. It is a further object of the invention to provide an advantageous method of operating an SCR dosing system.

SUMMARY OF INVENTION

According to a first aspect of the present invention, there is provided a reagent dosing system for dosing a reagent into the exhaust gas stream of an internal combustion engine, the system comprising:

a reagent tank for storing a supply of reagent;

an injector module comprising an atomising dispenser and a positive-displacement metering pump which draws reagent from the reagent tank and delivers it to the dispenser;

a supply line coupling the reagent tank to the injector module;

a dosing control unit operable to control the injector module to inject reagent into the exhaust gas stream; and an additional priming pump arranged, in use, to urge reagent along the supply line toward the injector module.

The dispenser may be closely-coupled to the metering pump and, typically, the dispenser is integrated in the same unit as the metering pump.

The priming pump may be arranged, in use, to urge reagent along the supply line toward the injector module at or during a start-up mode and/or to urge reagent along the supply line toward the injector module continuously or intermittently during running of the engine.

The system may further comprise a tank module mountable within the reagent tank, said tank module comprising:

a reservoir comprising a tubular member with a first open end and a second closed end, the second end having an opening therein to enable the inflow of reagent from the reagent tank;

a closure member for closing the first end of the tubular member to prevent the flow of reagent therefrom; and a reagent pickup tube having a first end disposed within said reservoir and a second end in fluid communication with said supply line;

wherein the priming pump is disposed within the tank module.

Conveniently, said dosing control unit is operable to transmit and receive data to/from an engine control unit, the engine control unit being operable to control an internal combustion engine to which the dosing system is installed. The dosing control unit may be operable to transmit and receive data to/from said engine control unit via a CAN link.

Alternatively, said dosing control unit may be physically integrated with an engine control unit, the engine control unit being operable to control an internal combustion engine to which the dosing system is installed.

According to another aspect of the present invention, there is provided an exhaust system for an internal combustion engine comprising:

a common exhaust portion having a first end coupled to the engine for receiving an exhaust gas stream emitted therefrom and a second end which divides into first and second branches, the common exhaust portion comprising a particulate filter and said first and second branches comprising first and second SCR catalysts, respectively;

a first SCR doser for injecting reagent into said first branch at a location disposed upstream of said first SCR catalyst; and a second SCR doser for injecting reagent into said second branch at a location disposed upstream of said second SCR catalyst.

According to another aspect of the present invention, there is provided an exhaust system for an internal combustion engine comprising:

a common exhaust portion having a first end coupled to the engine for receiving an exhaust gas stream emitted therefrom and a second end which divides into first and second branches;

said first branch comprising a first particulate filter, a first SCR catalyst and a first SCR doser for injecting reagent into said first branch at a location disposed between said first particulate filter and said first SCR catalyst; and said second branch comprising a second particulate filter, a second SCR catalyst and a second SCR doser for injecting reagent into said second branch at a location disposed between said second particulate filter and said second SCR catalyst.

According to another aspect of the present invention, there is provided an exhaust system for an internal combustion engine comprising:

a common exhaust portion comprising a particulate filter and having a first end coupled to the engine for receiving an exhaust gas stream emitted therefrom and a second end which divides into first and second branches;

wherein the first branch comprises an SCR catalyst and an SCR doser for injecting reagent into said first branch at a location disposed upstream of said SCR catalyst; and the second branch comprises a Lean NOx Trap and a hydrocarbon doser for injecting hydrocarbons into said second branch at a location disposed upstream of said Lean NOx Trap.

The exhaust system may comprise a 3-way valve disposed at said second end of said common exhaust portion, said valve being operable to direct said exhaust gas stream along said first and/or said second branch.

According to another aspect of the present invention, there is provided a method of dosing a reagent into the exhaust gas stream of an internal combustion engine having an SCR catalyst, the method comprising:

injecting reagent with a spray momentum into the exhaust gas stream using an injector module comprising a positive-displacement metering pump and an atomising dispenser;

controlling the positive-displacement metering pump in accordance with a control parameter which is dependent on the exhaust gas stream space velocity so that the spray momentum provides optimum mixing of the injected reagent with the exhaust gas stream upstream of the SCR catalyst.

Typically, but not necessarily, said control parameter is a drive current level.

It will be appreciated that preferred and/or optional features of any aspect of the invention may be incorporated alone or in appropriate combination in any other aspect of the invention also.

BRIEF DESCRIPTION OF DRAWINGS

Embodiments of the present invention will now be described, by way of example only, with reference to the accompanying drawings, in which.

DETAILED DESCRIPTION OF PREFERRED EMBODIMENTS

Figure 1:
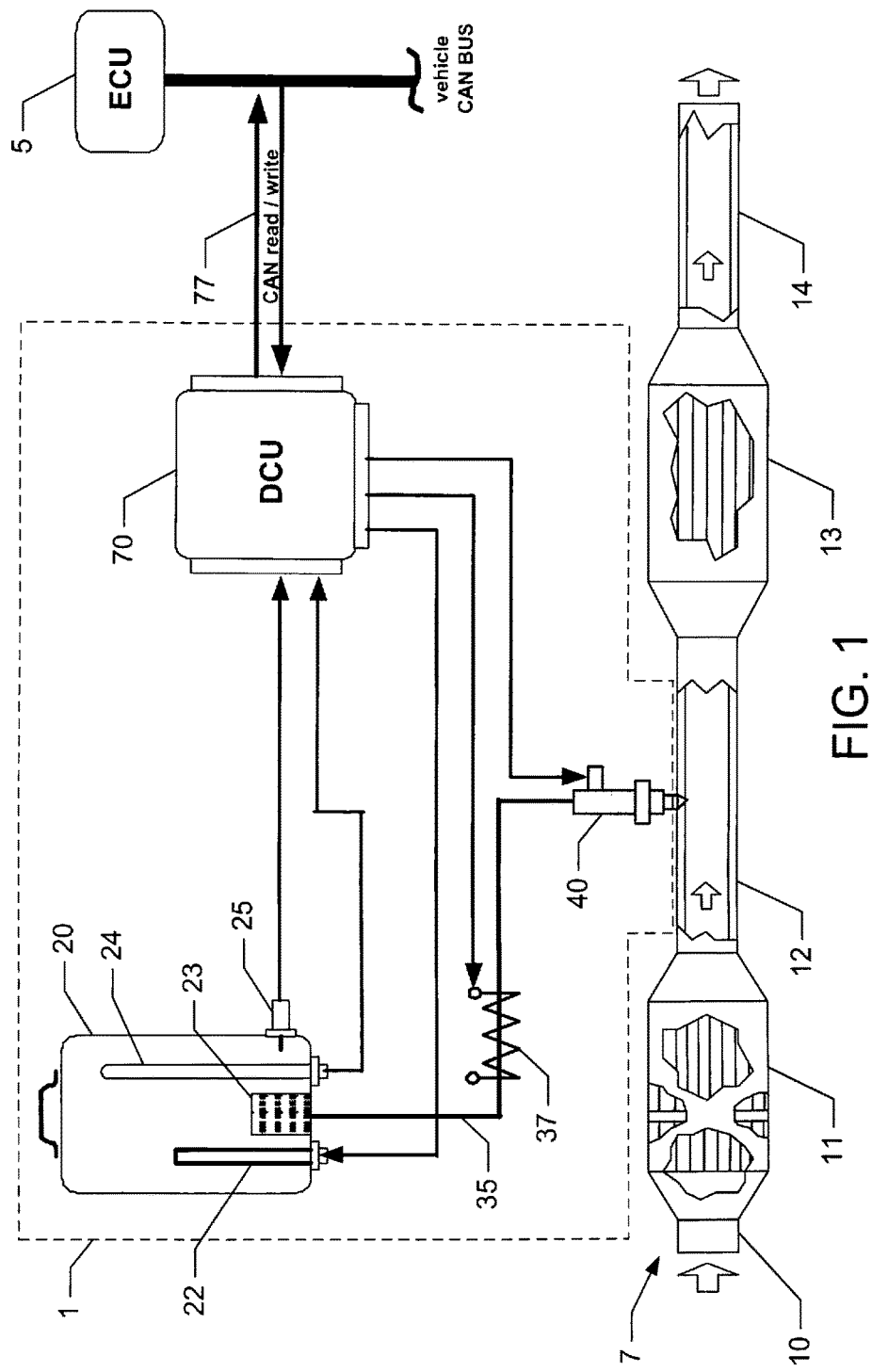
FIG. 1 shows an SCR dosing system which may be used to implement methods of the present invention.
Figure 2:
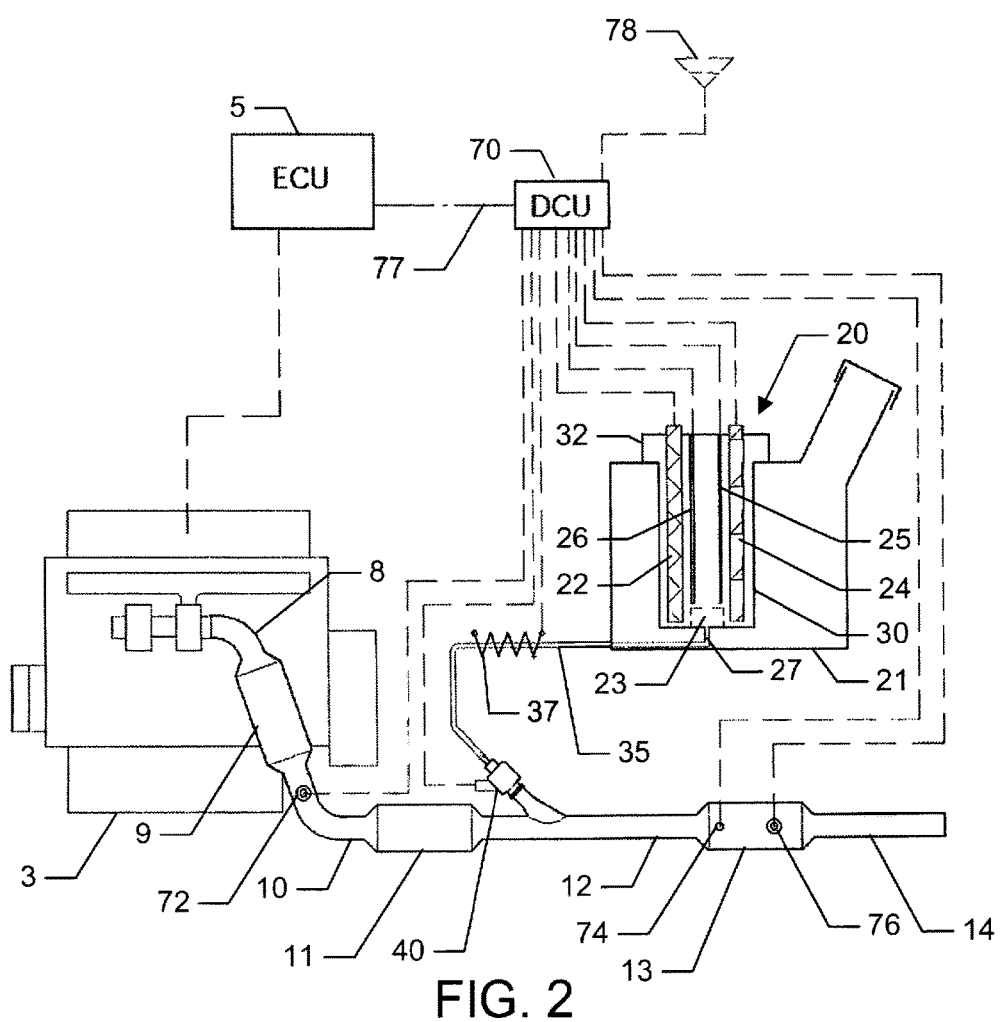
FIG. 2 is an alternative representation of the SCR dosing system of FIG. 1.

Referring to FIGS. 1 and 2, the SCR dosing system 1 is operable to inject a quantity of reagent (or reductant) into the exhaust gas stream emitted from an internal combustion engine 3. The internal combustion engine 3 is a diesel fuelled compression-ignition combustion engine.

The internal combustion engine 3 is controlled by an engine control unit (ECU) 5. An exhaust system 7 is coupled to the internal combustion engine 3 for conveying exhaust gas emissions therefrom.

The exhaust system 7 comprises first, second, third and fourth portions 8, 10, 12, 14. The exhaust system 7 also includes a diesel oxidation catalyst 9, disposed between the first and second exhaust portions 8, 10, a diesel particulate filter 11 (DPF), disposed between the second and third exhaust portions 10, 12, and a selective catalytic reduction (SCR) catalyst 13, disposed between the third and fourth exhaust portions 12, 14.

During operation of the internal combustion engine 3, exhaust gas emissions from the engine enter the first exhaust portion 8 and pass through the oxidation catalyst 9, the DPF 11 and the SCR catalyst 13, before exiting via the fourth exhaust portion 14. The SCR dosing system 1 generally comprises a tank module 20, an injector module 40 and a dosing control unit (DCU) 70, each of which will now be described in more detail.

The tank module 20 is installed within a reagent tank 21, which stores a supply of a suitable reagent (or reductant), such as aqueous urea. Aqueous urea is also known as "ADBLUE"® and as "Diesel Emissions Fluid" and, in the present embodiment, the reagent is a eutectic solution of aqueous urea (32.5% by weight of urea in water). The reagent tank 21 may be formed from a suitable plastic polymer, such as high density polyethylene (HDPE).

The tank module 20 comprises a deep drawn stainless steel cup or reservoir 30 and a polymer closure or cap 32. The cup or reservoir 30 may alternatively be made from a suitable polymer or plastics material.

The tank module 20 also includes all or some of a reagent heater 22, a reagent filter 23, a reagent level sensor 24, a reagent temperature sensor 25, a reagent quality sensor 26 and a reagent pickup tube 27, all of which may be integral with the cap 32. The reagent temperature sensor 25 may be, for example, a thermistor. The electrical connections for the reagent heater 22, as well as those for the reagent level, temperature and quality sensors 24, 25, 26 pass through the cap 32.

The base of the reservoir 30 is pierced to form a hole which allows reagent in the reagent tank 21 to flow into the tank module 20. The hole may be fitted with a one-way valve which permits reagent to flow into the tank module 20, but prevents it from flowing back into the reagent tank 21.

The function of the reservoir 30 is to provide a structurally stable housing for the reagent filter 23, reagent heater 22 and reagent level sensor 24, and to provide a container in which the melted reagent may be held following a cold soak start-up. This is necessary to meet the requirement that the dosing system 1 should be fully functional within a specified time interval from engine start-up, even under conditions where the reagent may be frozen (below −11° C. in the case of aqueous urea).

The tank module 20 may be mounted in any convenient location that permits accessibility for periodic servicing. The reagent tank 21 may be integrated into a vehicle fuel (hydrocarbon) tank, such that it is submerged in the fuel or otherwise co-located, or it may be a stand-alone module. The reagent tank 21 may be pressurised, for example, by engine intake boost air pressure.

As the reagent tank 21 becomes depleted, but ideally before it becomes totally exhausted, the contents must be replenished. This may be achieved by means of any suitable replenishment strategy. For example, the reagent tank 21 may have its own discrete fill port or it may be associated with a combined vehicle fuel/reagent co-fuelling system such as that disclosed in U.S. Pat. No. 6,554,031 (Ford Global Technologies). Other replenishment strategies include cartridge refills at vehicle service appointment intervals and informal fill-ups which the tank filler must accommodate.

A first end of the reagent pickup tube 27 is disposed adjacent to the reagent filter 23, such that reagent in the reservoir 30 passes through the reagent filter 23 as it enters the pickup tube 27. A second end of the pickup tube 27 terminates at a wall of the reagent tank 21.

The injector module 40 is coupled to the reagent tank 21 by means of a supply line 35. A first end of the supply line 35 is attached to the second end of the reagent pickup tube 27 by any suitable connecting means. A second end of the supply line 35 is connected to the injector module 40 for delivering reagent thereto.

The supply line 35 is provided with a supply line heater 37 for elevating the temperature of reagent within the supply line 35 when the ambient temperature falls below minus 11 degrees Celsius. The supply line heater 37 may be an electrically resistive element embedded within the supply line 35. Alternatively the element may be coiled around the external surface of the supply line 35. It will be appreciated by those skilled in the art that any suitable heating means could be employed in order to heat the supply line 35.

Although in FIG. 2, the reagent pickup tube 27 is shown coming out of the bottom of the reservoir 30, the reagent pickup tube 27 may, alternatively, pass through the cap 32, with one end extending into the reservoir 30 and the other end connected to the supply line 35. Alternatively, the reagent pickup tube may pass through a side wall of the reservoir 30.

The injector module generally comprises an electrically actuated variable frequency fixed stroke positive displacement piston pump that delivers discrete fixed-volume parcels of reagent to a close-coupled atomizing nozzle.

Figure 3:
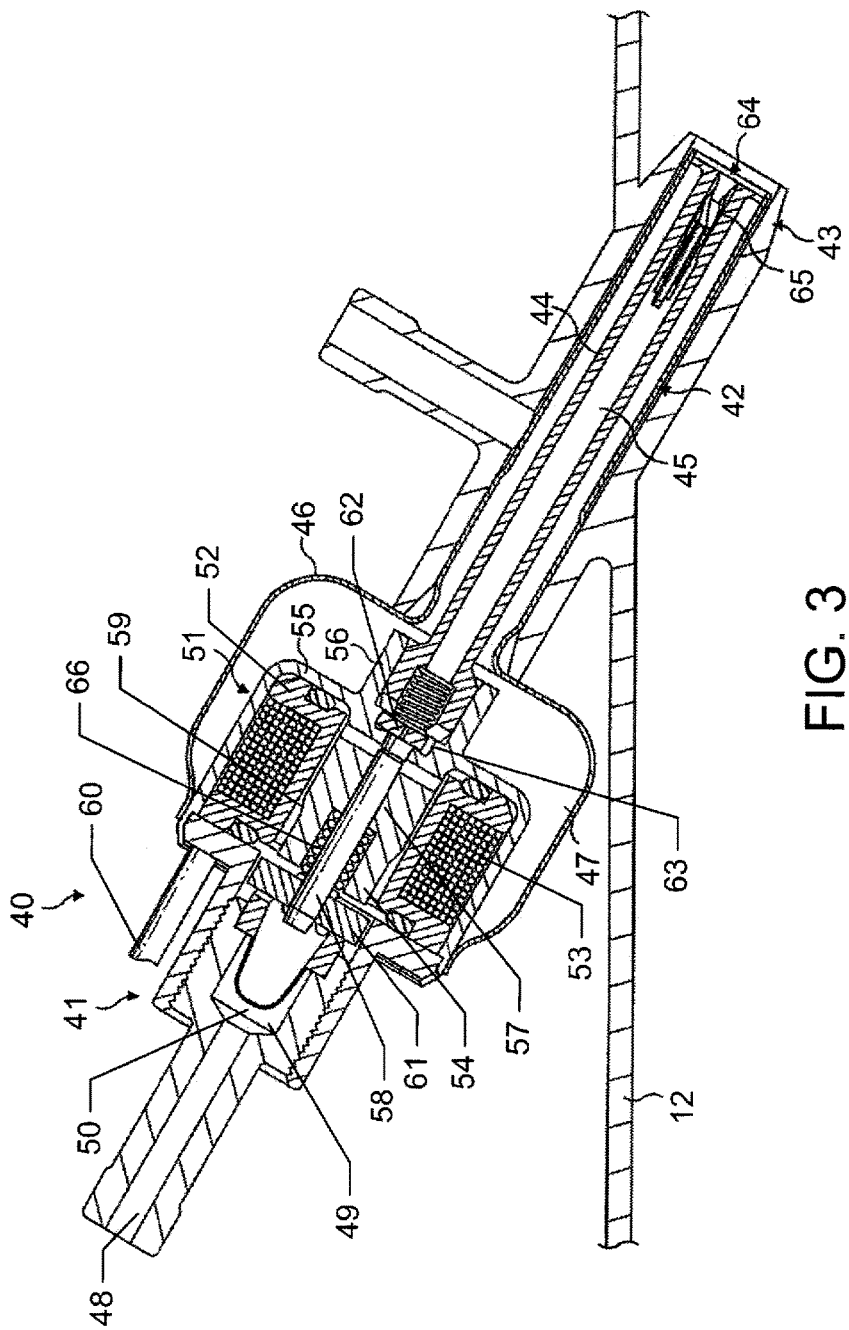
FIG. 3 is a sectional view of an injector module of the system of FIGS. 1 and 2.

Referring to FIG. 3, the injector module 40 comprises a metering pump 41 and a dispenser (or atomiser) 42, which are integrated within the same unit and coupled together by a connecting pipe 43. The metering pump 41 and atomiser 42 are closely coupled and form an integrated unit. The injector module 40 is mounted to the third exhaust portion 12 of the exhaust system 7, upstream of the SCR catalyst 13. The dispenser 42 is disposed within the flow of exhaust gases in the exhaust system 7 and is arranged at such an attitude that its spray cooperates with the exhaust flow to give optimum mixing between gas and reagent. The metering pump 41 is disposed outside the exhaust system 7 so that it may benefit from exposure to ambient cooling air.

The connecting pipe 43 comprises a tube 44 having a bore 45 through which reagent can pass. The tube 44 is capable of accommodating reagent at high pressure. The tube 44 is received within a jacket 46 for the connecting pipe 43 which defines a compartment 47 between the tube 44 and the jacket 46. The compartment 47 is evacuated to limit the transfer of heat from the hot exhaust gases within the third exhaust portion 12 to the reagent in the bore 45 of the tube 44 so as to prevent overheating of the reagent.

The metering pump 41 comprises an inlet passage 48 and a filter chamber 49, disposed in fluid communication with, and downstream of, the inlet passage 48. The filter chamber 49 accommodates a reagent filter 50.

The metering pump 41 also includes an actuator arrangement comprising a pole element 51, a coil former 52 and a solenoid coil 53. The pole element 51 comprises a generally cylindrical inner pole piece 54, an outwardly-directed flange 55 and a central tubular land or projection 56 situated downstream of the flange 55. The pole element 51 includes an axial bore 57. A plunger 58 is slidably accommodated within the bore 57. The coil former 52 is disposed around the inner pole piece 54 of the pole element 51, and a supply passage 59 is defined between the coil former 52 and the inner pole piece 54.

The coil 53 is in electrical communication with a power supply (not shown) by way of a supply cable 60. The power supply is capable of supplying a variable current to the coil 53 so as to induce a variable magnetic field around the coil 53.

A disc-shaped armature 61 is attached to an upstream end of the plunger 58. A delivery valve 62 is provided downstream of the plunger 58. A pumping chamber 63 is defined between the downstream end of the plunger 58 and the delivery valve 62.

In use, reagent flows from the inlet passage 48 through the reagent filter 50, which serves to filter solid particles such as precipitates out of the reagent flow. Thereafter the reagent can flow past the armature 61 into the pumping chamber 63 via the supply passage 59. In order to dispense reagent, a current is passed through the coil 53 to energise the coil 104 and induce a magnetic field around the coil 53. The resulting magnetic field exerts a force on the armature 61 which, in turn, drives a pumping stroke of the plunger 58. The volume of the pumping chamber 63 is reduced due to the movement of the plunger 58, so that the pressure of the reagent in the pumping chamber 63 increases. When the pressure in the pumping chamber 63 reaches a threshold value, reagent is expelled through the delivery valve 62, thereby increasing the pressure of reagent in the tube 44 of the connecting pipe 43.

The dispenser 42 comprises a nozzle valve 64, in the form of an outwardly opening 'poppet' valve. The nozzle valve 64 comprises a valve element 65 which is biased by means of a spring toward a non-injecting position. When the pressure of the reagent in the tube exceeds a threshold value, the valve element is forced into an injecting position and reagent is expelled from the dispenser.

When the plunger 58 of the pump 41 reaches the end of its pumping stroke, pressure changes take place within the injector module 40 so that the nozzle valve 64 and the delivery valve 62 close and the expulsion of reagent through the dispenser 42 stops. When the current flow through the coil 53 is switched off, the magnetic field around the coil 53 diminishes. The magnetic force acting on the plunger 58, by way of the armature 61, diminishes and a return spring 66 biases the plunger 58 in the upstream direction. As the volume of the pumping chamber 63 increases, reagent can flow into the pumping chamber 63 ready for the next pumping stroke.

The injector module 40 is described in more detail in the Applicant's co-pending European Patent Publication No. 1878920, the contents of which are incorporated herein by reference.

The above-described metering pump 41 employs a positive displacement metering principle as opposed to a pressure/time metering method. More specifically, by driving a plunger 58 of known diameter through a known and fixed stroke, a discrete known and invariable (fixed) volume of reagent is displaced. This results in the metering of a highly repeatable and consistent volumetric quantity of reagent.

Since the objective of the SCR dosing system 1 is to eliminate NOx from the exhaust gases downstream of the SCR catalyst 13, reagent dosing requires a high order of volumetric accuracy since too low a dosing rate will result in NOx breakthrough and too high a rate will result in ammonia slip past the catalyst. Both of these outcomes are highly undesirable. The positive displacement metering principle employed in the present invention meets the requirement for accuracy of dosing in a simple and effective manner. Also for accuracy in dosing, it is preferable to have a hydraulically "stiff" system between the metering pump 41 and the atomizing dispenser 42 and this is achieved in the above-described embodiment by having these two units relatively closely coupled within an integrated unit so that the internal dead volume, and thus system compliance, is low.

An advantage of the above-described injector module relative to the prior art is that, by virtue of the positive displacement metering principle, a separate pressurizing pump located in or near the tank module is not required. This is because the action of the metering pump 41 draws reagent along the supply line from the reagent tank 21. Furthermore, the high pressure generated by the metering pump 41 at the nozzle valve 64 of the dispenser 42, e.g. of the order of 50 bar, is sufficient to keep the nozzle valve 64 free from crystallized urea, thereby obviating the need for a purge system after engine shut-down. Also, by keeping the nozzle valve 64 clear, the quantity of reagent delivered with each pumping stroke of the plunger 58 can be kept constant.

Another advantage of the above-described injector module 40 is that the metering pump 41 does not require an intermediate diaphragm between the pumping plunger 58 and the reagent. Accordingly, the positive displacement metering pump 41 in the present invention can generate higher pressures, and deliver a desired volumetric quantity of reagent with greater accuracy, than conventional positive displacement pumps.

Variation in reagent flow rate to match the engine NOx (or other pollutant) production rate can be made by varying the pump stroke repetition rate (pumping frequency) in unit time. By way of example, if the metering pump displacement per stroke is 4 mm³, then at an operational frequency of 5 Hz the pump will displace 1.2 ml/minute of reagent (4×5×60/1000), and this will scale linearly with frequency so that at 100 Hz the displaced volume will be 24 ml/minute. This highly linear response of delivery to pumping frequency is also advantageous for simplification of the control logic.

A further advantage of the above-described injector module 40 is the transient response or change of rate of dosing flow which can be obtained. More specifically, the metering pump 41 may be driven at a repetition rate or frequency of 0 Hz (zero flow) and then immediately go to maximum repetition rate of, for example, 150 Hz and then back to 0 Hz. Although some pressure/time metered dosing systems may also demonstrate this functionality, particularly if the dosing (metering) valve is close to the nozzle, the frequency controlled metering pump 41 in the present invention can additionally be driven in a "burst" mode in which it may be over-driven to, for example, 175 Hz in order to address a short term transient requirement.

Yet another advantage of the hydraulically stiff positive displacement metering concept is the ability to develop high injection pressure and impart high momentum to the atomized reagent. The high injection pressure is beneficial in achieving the fine reagent atomization that is desirable for mixing in the exhaust flow, and for dislodging crystallized reagent from the nozzle that might otherwise clog or derange the spray pattern. Thus, with this configuration, the need for a purge circuit is avoided.

Still another advantage of the positive displacement concept is that accurate totalization of reagent flow over time becomes possible if a running tally of valid executed pump strokes is kept in memory. This information can be used to either negate the need for the reagent level sensor 24 in the reagent tank 21, or to supplement the information from a low cost low resolution level sensor, or to provide supporting information to an OBD (On-Board Diagnostics) module.

As explained previously, the purpose of the dispenser 42 is to atomize the reagent as finely and uniformly as possible and to project it with a spray pattern that enables it to mix with and evaporate in the exhaust gas stream in such a manner that, irrespective of the exhaust flow rate, the conversion from reagent to ammonia occurs in the distance between nozzle 64 and SCR catalyst 13 and that the ammonia be presented to the SCR catalyst 13 uniformly across its face. This requires the spray pattern to match and cooperate with the particular exhaust system geometry immediately upstream of the SCR catalyst 13.

Achievement of these objectives is highly desirable, since it permits both the nozzle-to-catalyst distance to be shorter and the catalyst size to be smaller than would be the case for an imperfect atomizing nozzle. In some cases, the atomizing nozzle will be used in conjunction with a "mixer" device in the exhaust pipe which enhances reagent mixing with the exhaust stream by converting the laminar gas flow into turbulent flow prior to the catalyst, and in other cases a "hydrolysis" catalyst may be employed immediately ahead of the SCR catalyst 13 to aid in the reduction of urea to ammonia.

The metering pump-injector module in the present invention may be used with or without the mixing aids described above.

A further advantage of the hydraulically stiff positive displacement metering system is its potential for delivering very small quantities of reagent directly into the combustion zone of the engine so that the benefits of SNCR may be exploited. This is described in more detail in the Applicant's U.S. Pat. No. 6,679,200. In SNCR, NOx reduction takes place without the aid of a catalyst but only over a relatively narrow temperature window that occurs immediately following the combustion event. This however takes place under all conditions, even when the engine is cold and the SCR system is not yet functional. Therefore the potential exists to advantageously combine the two NOx reduction techniques to achieve an overall conversion ratio higher than either one method alone. Thus, both SCR and SNCR techniques may be employed using an injector module 40 of the kind described above and, advantageously, multiple injector modules may be controlled by the same DCU.

Yet another advantage of the above-described system is that it is of a single fluid architecture in which only aqueous urea (or other type of reagent) is dispensed. This eliminates the need for a second fluid, such as pressurized air, which is used in prior art systems to assist the atomization of the aqueous urea into the NOx-laden exhaust stream, and also to help resist the formation of crystallized salts which can clog and otherwise derange the system operation.

The DCU 70 controls the reagent dosing strategy and may comprise processing means, such as a microprocessor, and memory means, for storing the required software control strategies. The DCU 70 receives signals from various engine and vehicle-mounted sensors and uses these inputs to compute an appropriate output to the metering pump 41. Additionally, the DCU 70 controls the tank module reagent heater 22 and the supply line heater 37.

The DCU 70 receives inputs from the reagent level sensor 24, the reagent temperature sensor 25 and the reagent quality sensor 26. Furthermore, the SCR dosing system 1 includes a NOx sensor 72, an SCR catalyst temperature sensor 74 and an ammonia ($NH_3$) sensor 76. The NOx sensor 72 is disposed in the second exhaust portion 10, between the oxidation catalyst 9 and the DPF 11. The SCR catalyst temperature sensor 74 and the $NH_3$ sensor 76 are disposed adjacent to the SCR catalyst 13.

In the present embodiment, the DCU 70 and the ECU 5 are linked via a CAN link 77, or other suitable connection, which enables data to be transferred therebetween. The DCU 70 also has an antenna 78 for sending and receiving data to/from external sources.

Depending on the particular system architecture and hardware functionality, the DCU 70 may be configured to perform one or more of the following;
a) NOx estimation model for engine exhaust. For example, the DCU 70 may receive data relating to engine operating conditions from the ECU 5 via the CAN link 77 and compare the received data to pre-stored data in order to estimate engine NOx mass production.
b) NOx sensor monitoring from upstream and/or downstream (of catalyst). For example, the NOx sensor 72 may output a signal indicative of the NOx concentration in the exhaust gas stream. An additional NOx sensor may be disposed in the fourth exhaust portion 14 in order to detect NOx slip downstream of the SCR catalyst 13.
c) $NH_3$ (ammonia) sensor monitoring from midpoint or downstream of catalyst. The $NH_3$ sensor 76 may be used to detect when over-dosing of reagent occurs.
d) Monitoring of system temperatures including reagent, exhaust, catalyst, ambient. This may be achieved by means of the reagent temperature sensor 25, SCR catalyst temperature sensor 74, and other suitably placed temperature sensors.
e) Monitoring of engine intake humidity.
f) Monitoring of engine inlet and/or exhaust $O_2$ (oxygen) content to estimate Exhaust Gas Recirculation (EGR) level.

g) Monitoring of reagent level in tank module from reagent level sensor 24 output.

h) Monitoring of reagent solution quality using reagent quality sensor 26.

i) Monitoring of pump stoke completion via glitch detection.

j) Estimation of reagent level in tank module from cumulative valid pump stroke count. Since a fixed volume of reagent is dispensed with each valid pump stroke, if the initial quantity of regent in the reagent tank 21 is known, then the remaining quantity can be deduced from the total number of valid pump strokes performed.

k) Control of pump actuator drive energy level to achieve a valid stroke.

l) Control of reagent delivery quantity in unit time through injector actuation frequency.

m) Control of reagent heaters for tank module and heated lines to injector. For example, the reagent heater 22 and/or the supply line heater 37 may be switched on in the event that a temperature detected by the reagent temperature sensor 25 is below a threshold value.

n) Perform sensor linearizations.

o) Perform system diagnostic surveys.

p) Perform On-Board Diagnostic (OBD) reporting functions. Faults or anomalies in the dosing system may be reported to the user.

q) Maintain system fault database.

r) Communicate with vehicle/engine control module, for example, by means of the CAN link 77 or other suitable connection.

s) Communicate with off-board reagent dispensing device, for example, by means of the antenna 78.

t) Proportional control of reagent delivery between SNCR and SCR. In cases where both selective non-catalytic reduction and selective catalytic reduction are employed, the DCU 70 may be operable to adjust reagent delivery accordingly.

The SCR dosing system of the present invention has all of the attributes of the system described previously.

Figure 4:
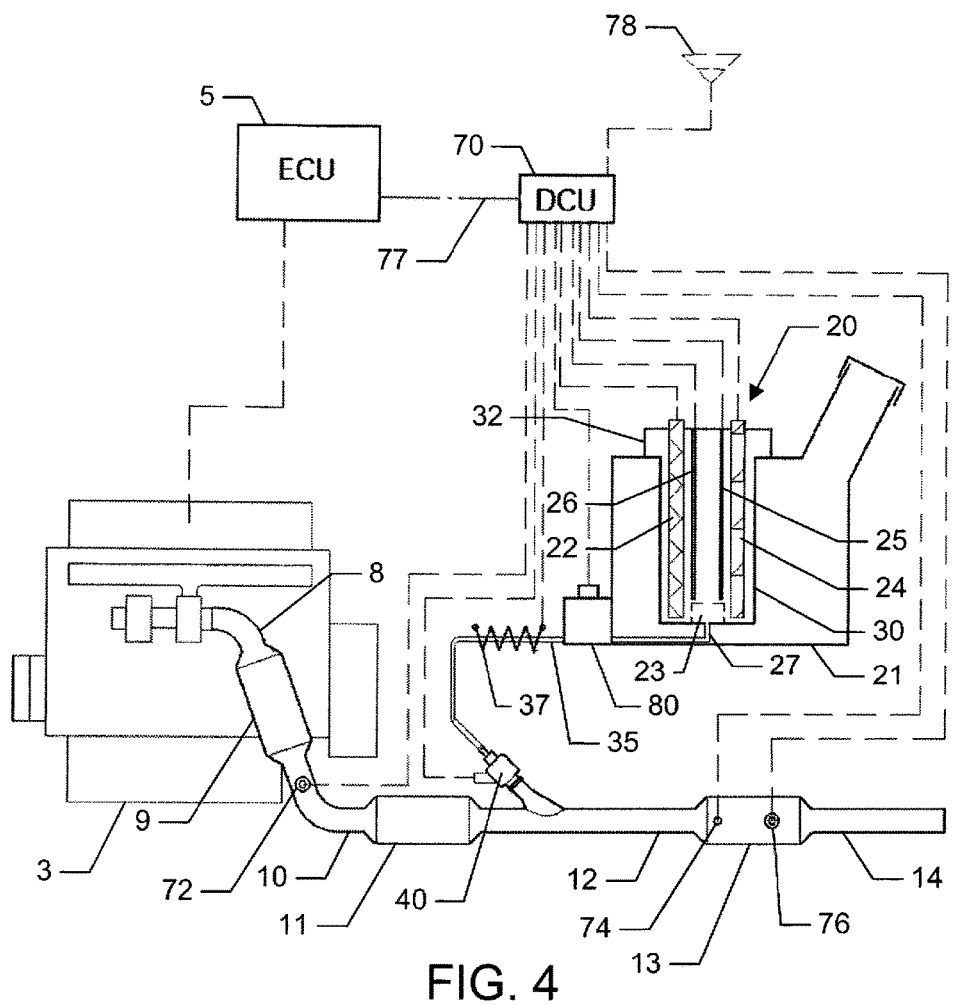
FIG. 4 shows an embodiment of an SCR dosing system according to the present invention comprising a priming pump.

Referring to FIG. 4, there is shown an SCR dosing system 1 of the present invention in which like numbers to those in FIG. 1 are used to denote similar parts. Importantly, the SCR dosing system in FIG. 4 further comprises a priming pump 80 in addition to the positive-displacement metering pump 41 of the injector module 40. The priming pump 80 is disposed adjacent to the reagent tank 21, and is operable to urge reagent along the supply line 35 from the reagent tank 21 toward the injector module 40.

The arrangement shown in FIG. 4 is particularly beneficial in cases where the reagent tank 21 is spaced far apart from the injector module 40, or where the reagent tank 21 is not disposed sufficiently high enough above the injector module 40 for the reagent to flow along the supply line 35 under the influence of gravity alone. In such cases, the suction effect provided by the metering pump 41 may not be sufficient to draw reagent from the reagent tank 21 quickly enough to ensure that SCR of NOx in the exhaust gas stream starts soon enough after engine start to comply with legislative constraints.

The priming pump 80 need only be a low pressure pump (i.e. substantially less than 6 bar, and more probably only 0.5 bar). This is because, with the SCR dosing system 1 of the present invention, it is not necessary for reagent in the supply line 35 to be pressurised as highly as the pressure at the injector module nozzle valve 64. Accordingly, the cost of the priming pump 80 may be kept low.

The priming pump 80 may be operable at or immediately following engine-start, i.e. during a start-up mode of the engine, in order to prime the supply line 35 with reagent. Alternatively, or in addition, the priming pump 80 may operate continuously during running of the engine, or it may be operated intermittently during running of the engine as required to ensure an adequate quantity of reagent is supplied to the injector module 40 to ensure that a required dosing schedule is maintained. A pressure sensor may also be provided in the supply line 35 and the priming pump 80 may be operable in response to a signal from the sensor that is indicative of the pressure of reagent in the supply line 35.

As described above with reference to FIGS. 1 and 2, the DCU 70 may comprise processing means and memory means which are distinct from the ECU 5 of the vehicle in which the SCR dosing system 1 is installed. In this case, the CAN link 77 between the DCU 70 and the ECU 5 enables data to be transferred therebetween. Accordingly, with this configuration, the DCU 70 can receive input signals from existing sensors which serve the ECU 5.

Figure 5:
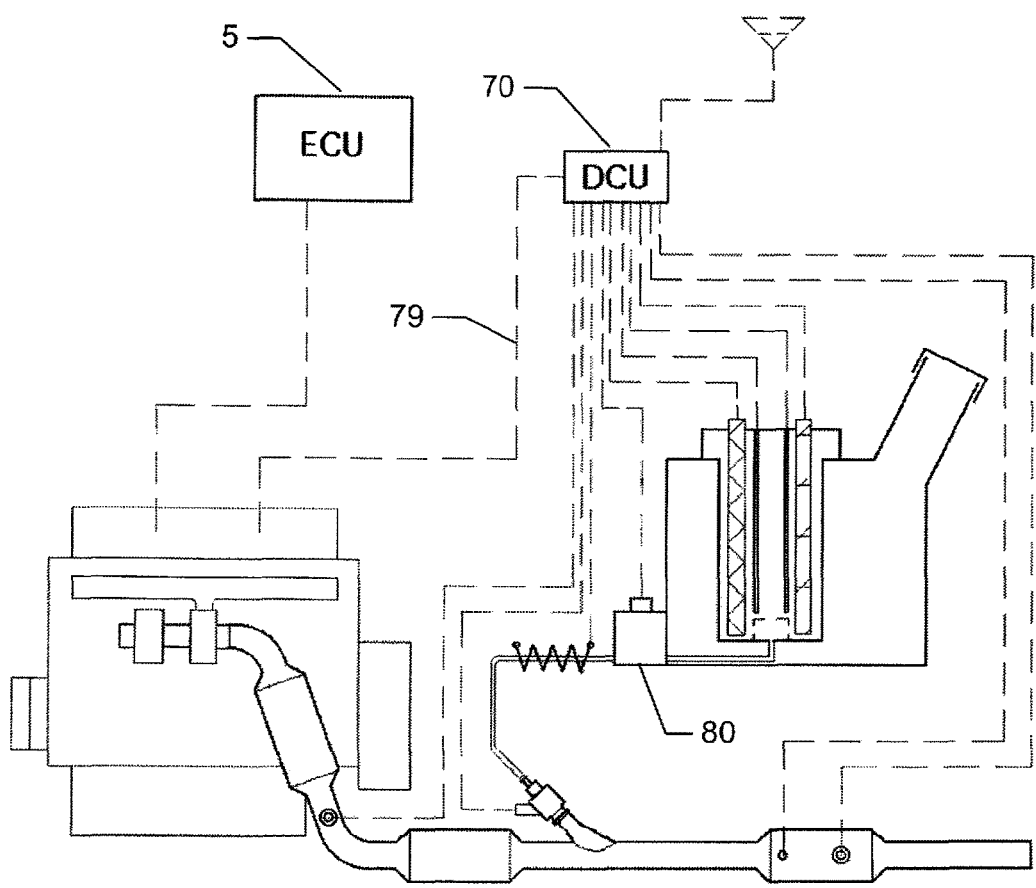
FIG. 5 shows a variation of the SCR dosing system of FIG. 4 comprising a stand-alone dosing control unit.

Referring to FIG. 5, in an alternative embodiment of the present invention, the DCU 70 may be a stand-alone unit, which is not linked to the vehicle ECU 5. In this case, the DCU 70 may be provided with its own array of engine mounted input sensors, which are distinct from those sensors which serve the ECU 5. The inputs from the engine mounted input sensors are indicated by reference numeral 79 in FIG. 5.

The embodiment of FIG. 5 is particularly useful for after-market applications in which the SCR dosing system 1 is retro-fitted to a vehicle. In this case, installation of the SCR dosing system 1 is simplified by the fact that it is not necessary to provide the CAN link 77 to the vehicle ECU 5, thereby any compatibility problems with the ECU 5 are avoided. Accordingly, with the stand-alone DCU of FIG. 5, the capability or authority of the DCU 70 may extend to full responsibility for all aspects of reductant dosing including NOx estimation based on engine models and/or sensors.

Figure 6:
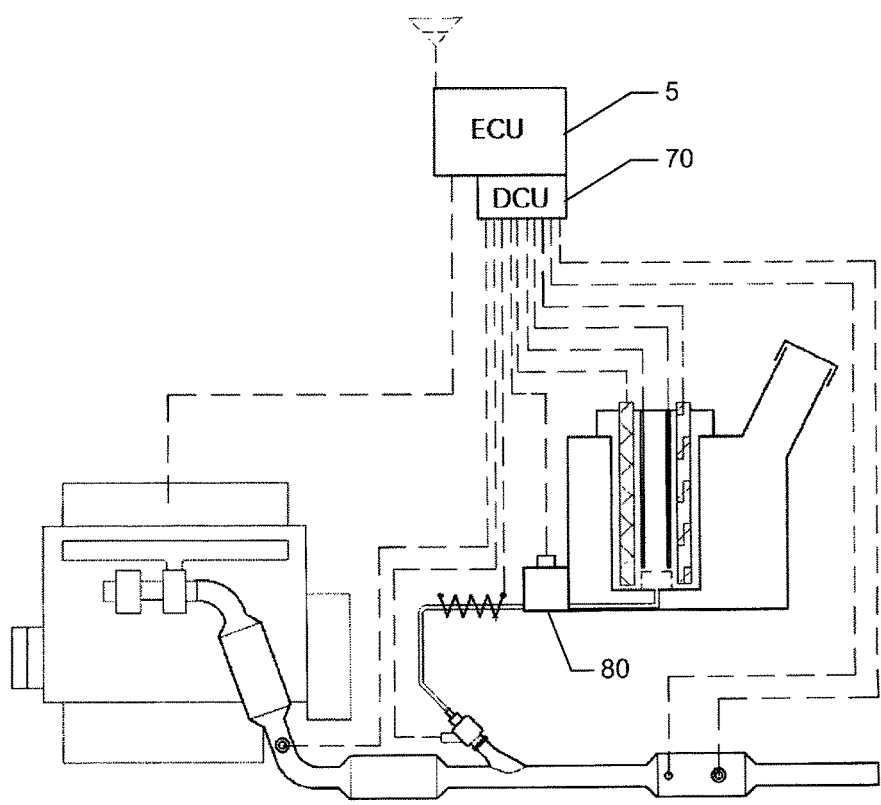
FIG. 6 shows a variation of the SCR dosing system of FIG. 4 comprising an integrated engine/dosing control unit.

Referring to FIG. 6, in another embodiment of the present invention, the DCU 70 may be physically integrated into the existing engine or vehicle control unit (ECU) 5. In this case, the DCU 70 may have a reduced level of authority, such that authority is split between the DCU 70 and the ECU 5.

Figure 7:
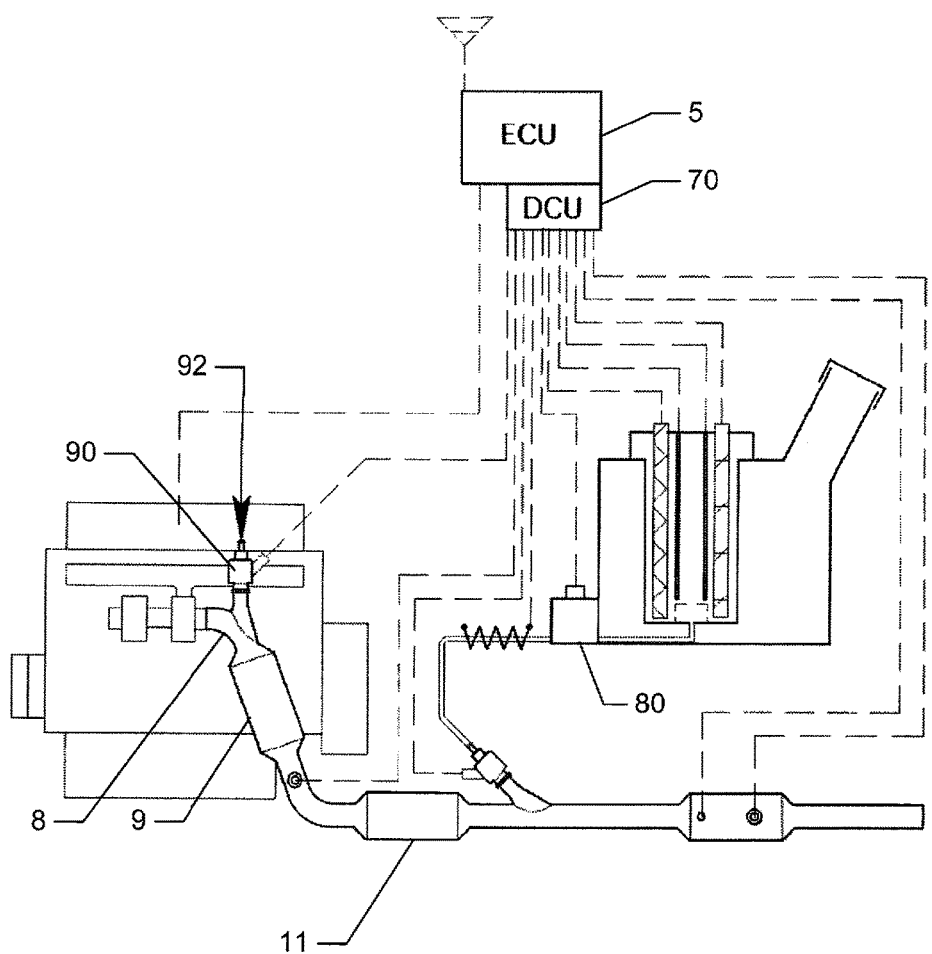
FIG. 7 shows a variation of the SCR dosing system of FIG. 6 comprising hydrocarbon dosing control.

Referring to FIG. 7, an additional injector module 90 may be provided to perform hydrocarbon (HC) dosing for regeneration of the DPF 11. The HC injector module 90 has the same configuration as the SCR reagent injector module 40 described previously. Thus, both the HC injector module 90 and the SCR injector module 40 can be controlled by the DCU 70.

The HC injector module 90 is installed in the first exhaust portion 8 of the exhaust system 7. The HC injector module 90 is connected to an HC supply 92, such as fuel supplied from the vehicle fuel tank. HC dosing from the HC injector module 90 produces an exothermal reaction in the exhaust oxidation catalyst 9 and the increase in temperature in the exhaust stream results in regeneration of the DPF 11 wherein carbonaceous particles trapped within the DPF 11 are oxidized.

With this configuration, problems associated with conventional late post-injection in-cylinder dosing can be avoided. More specifically, where HC dosing is performed in-cylinder, after a combustion event has taken place, fuel may adhere to the wall of the engine cylinder which can have an adverse effect on engine emissions performance and durability.

This problem does not arise with the configuration of FIG. 7 and, although this configuration requires a separate HC injector module, the system is simplified by the fact that a single DCU 70 may control a plurality of injector modules wherein, for example, one module doses a reductant for NOx remediation and the other module doses hydrocarbon (HC) for DPF regeneration.

Moreover, a single DCU may be operable to control a plurality of injector modules, for example in the case where a multi-bank engine has two separate exhaust systems with an SCR catalyst in each, as will be described in more detail below.

In the following description an injector module for injecting reductant into the exhaust gas stream for the purpose of NOx remediation is referred to as an "SCR doser". Also, an injector module used for injecting HC into the exhaust gas stream for the purpose of DPF regeneration is referred to as an "HC doser".

Figure 8:
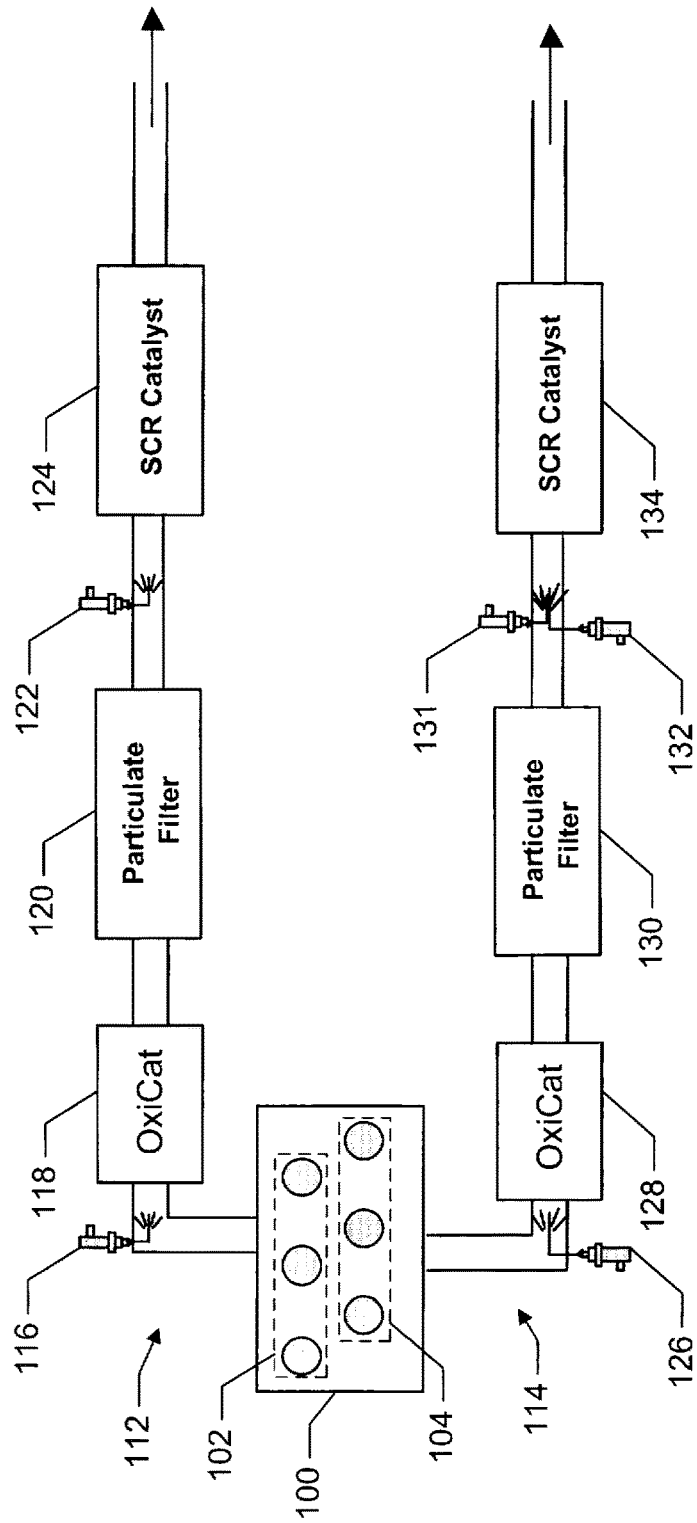
FIG. 8 shows a first exhaust system comprising an SCR dosing system according to the present invention.

Referring to FIG. 8, a multi-bank engine 100, such as a "V6" configuration, comprises first and second opposed banks of engine cylinders 102, 104. The exhaust system comprises first and second braches 112, 114, wherein each branch is associated with one of the first and second banks of engine cylinders 102, 104, respectively.

The first branch of the exhaust system 112 comprises a hydrocarbon (HC) doser 116, an oxidation catalyst 118, a particulate filter 120, an SCR doser 122 and an SCR catalyst 124. Similarly, the second branch of the exhaust system 114 comprises a hydrocarbon (HC) doser 126, an oxidation catalyst 128, a particulate filter 130, an SCR doser 132 and an SCR catalyst 134. The second branch 114 also includes an optional additional SCR doser 131. An additional SCR doser may optionally be included in the first branch 112 as well.

It is an advantage of the above-described exhaust system layout, that a single DCU may be employed to control SCR dosing in both the first and second branches 112, 114, by means of the respective SCR dosers 122, 132, 131. Furthermore, each of the HC dosers 116, 126 may have the same construction as the SCR dosers 122, 131, 132. In this case, the DCU 70 may be operable to control the HC dosers 116, 126 as well, thereby providing a simple and low cost system.

Figure 9:
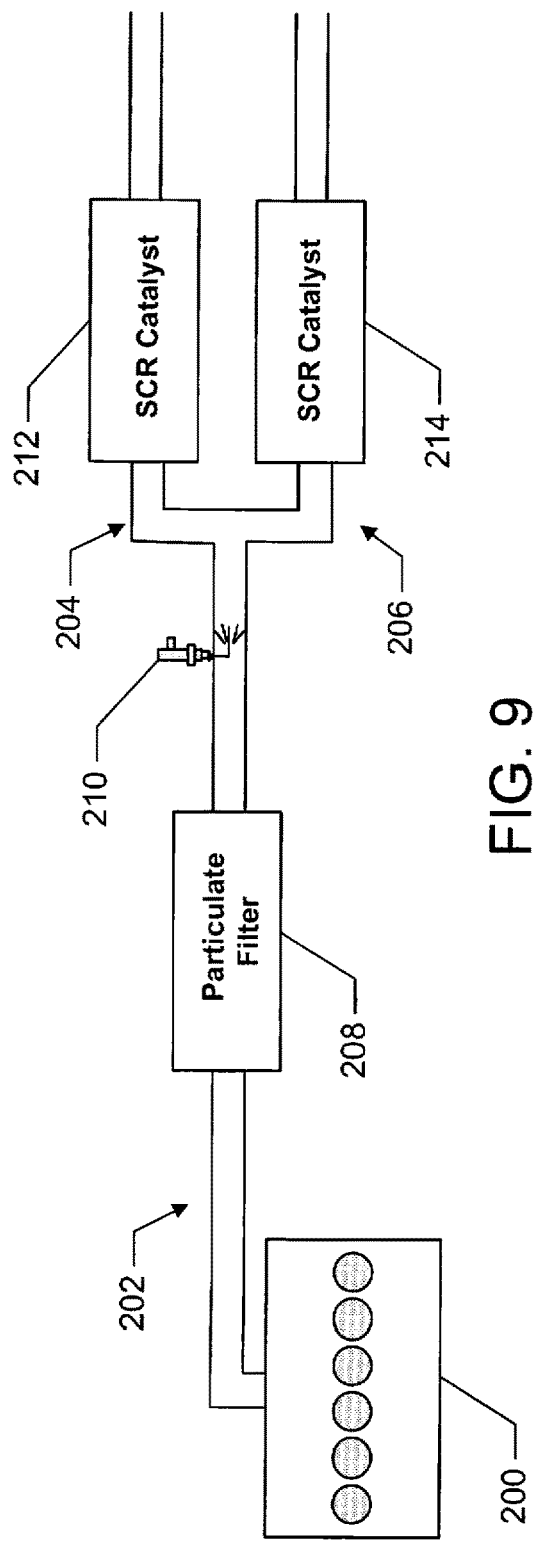
FIG. 9 shows a second exhaust system comprising an SCR dosing system according to the present invention.

Referring to FIG. 9, an engine 200 having a "straight six" configuration has an exhaust system which comprises a common exhaust portion 202, a first branch 204 and a second branch 206. The common exhaust portion 202 includes a particulate filter 208 and an SCR doser 210 disposed downstream from the particulate filter 208. Downstream from the SCR doser 210, the common exhaust portion 202 divides into the first and second branches 204, 206. The first and second branches 204, 206 comprise first and second SCR catalysts 212, 214, respectively.

With the above-described arrangement, a single SCR doser 210 may be employed to provide reagent for two separate SCR catalysts 212, 214.

Figure 10:
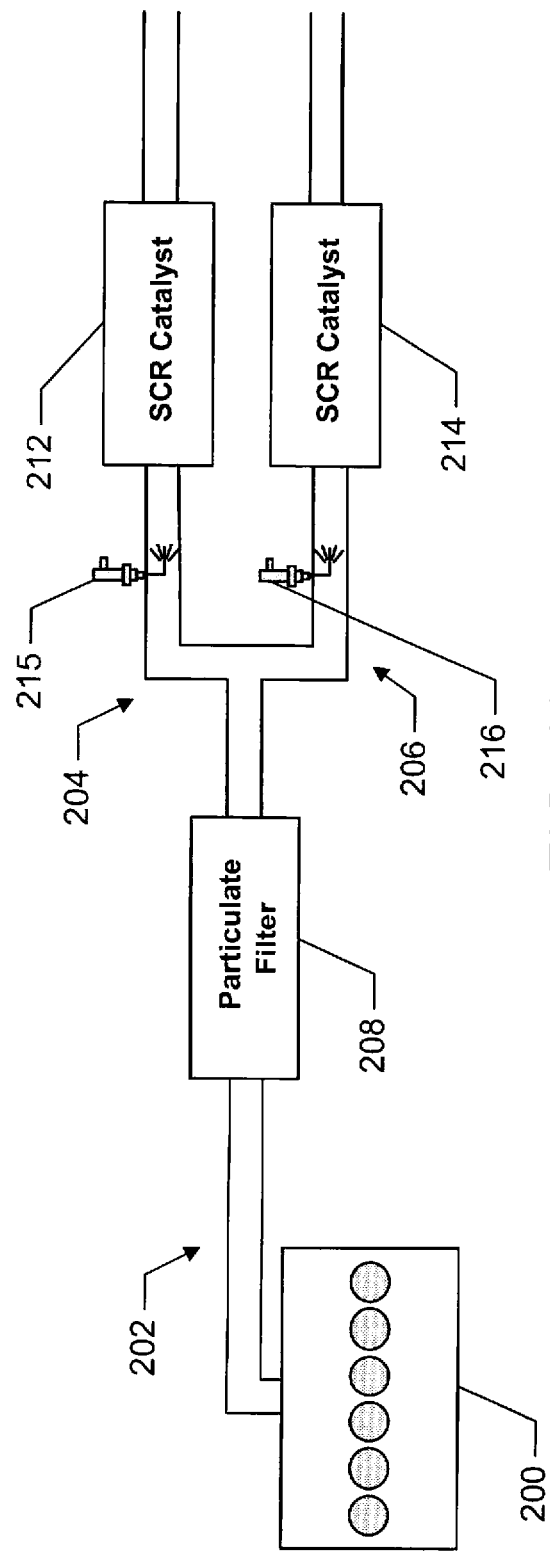
FIG. 10 shows a third exhaust system comprising an SCR dosing system according to the present invention.

Referring to FIG. 10, the exhaust system is the same as that shown in FIG. 6, with the exception that instead of the single SCR doser 210, first and second SCR dosers 215, 216 are provided in the first and second branches 204, 206, respectively. The first SCR doser 215 is disposed upstream of the first SCR catalyst and, likewise, the second SCR doser 216 is disposed upstream of the second SCR catalyst 214.

Figure 11:
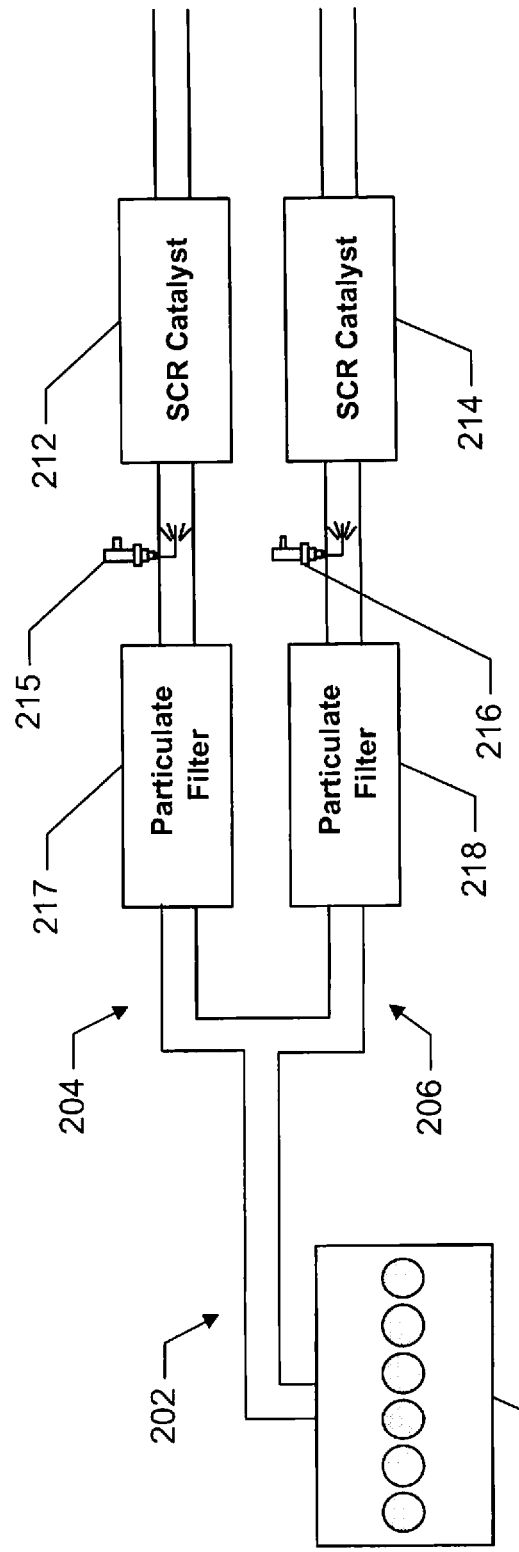
FIG. 11 shows a fourth exhaust system comprising an SCR dosing system according to the present invention.

Referring to FIG. 11, the exhaust system is the same as that shown in FIG. 10, with the exception that instead of the single particulate filter 208 in the common exhaust portion 202, first and second particulate filters 217, 218 are provided in the first and second branches 204, 206. The first particulate filter 217 is disposed upstream of the first SCR doser 215 and, likewise, the second particulate filter 218 is disposed upstream of the second SCR doser 216.

Figure 12:
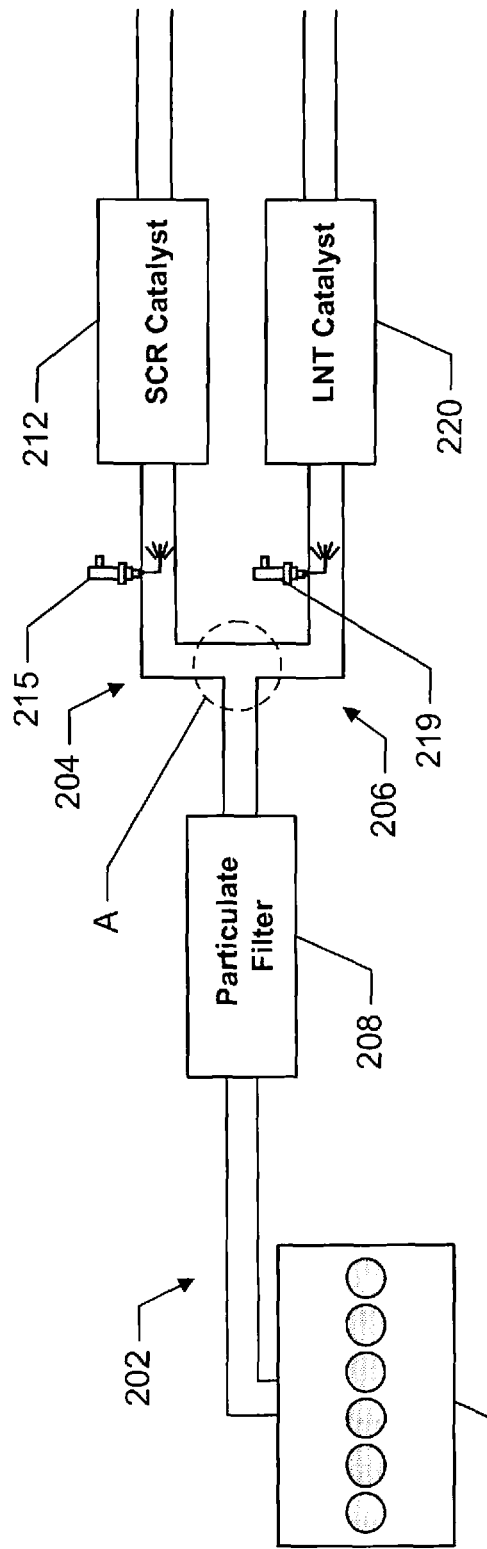
FIG. 12 shows a fifth exhaust system comprising an SCR dosing system according to the present invention.

Referring to FIG. 12, the exhaust system is similar to that shown in FIG. 10, with the exception that the second branch 206 comprises an HC doser 219 and a NOx adsorber or Lean NOx Trap (LNT) 220, rather than the second SCR doser 216 and second SCR catalyst 214. The HC doser 219 is disposed upstream of the LNT 220, in order to inject HC into the exhaust gas stream flowing in the second branch 206 so as to regenerate the LNT 220.

As explained previously, since the HC doser 219 can be an injector module having the same construction as the SCR doser 215, a single DCU can be configured to control reagent dosing of the SCR catalyst 212 and regeneration of the LNT 220.

Figure 13:
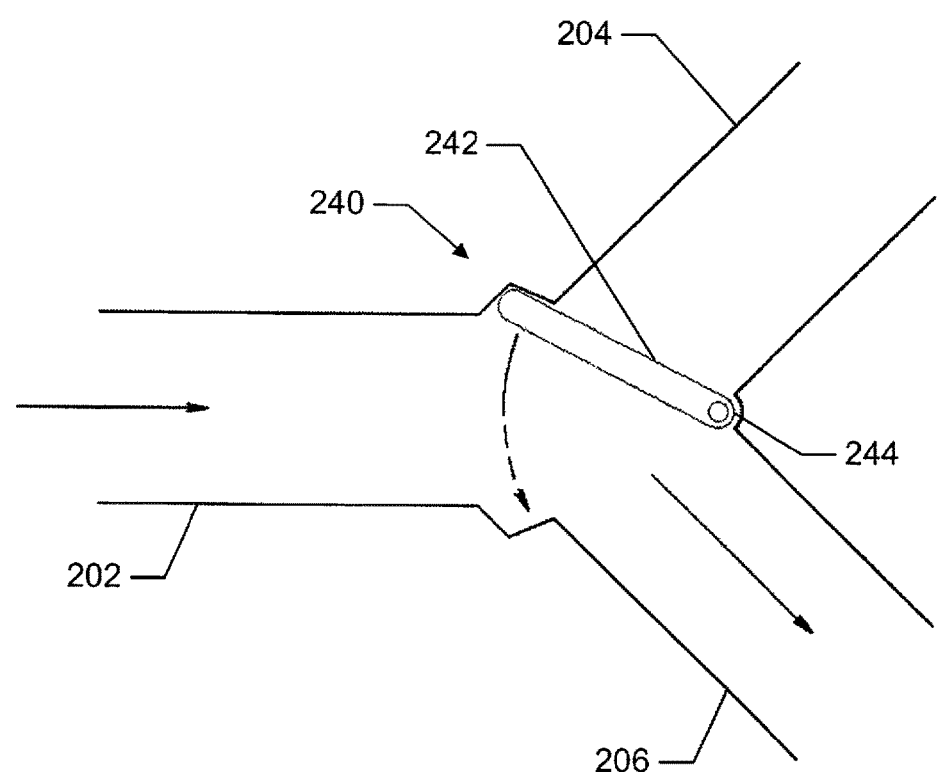
FIG. 13 shows a 3-way valve for use in the exhaust system shown in FIG. 12.

As shown in more detail in FIG. 13, the exhaust system also comprises a flap valve 240 disposed at the junction between the common exhaust portion 202, the first branch 204 and the second branch 206, i.e. in the region labelled 'A' in FIG. 12. The flap valve 240 comprises a flap 242, which is movable about a pivot 244. The flap 242 is sized so that it can block the mouth of either the first branch 204 or the second branch 206 depending on the rotation of the flap 242 about the pivot 244.

Movement of the flap 242 is controlled by an actuator (not shown), and the position of the flap determines whether the exhaust gas stream flows along the first branch 204, the second branch 206 or both the first and second branches 204, 206 concurrently.

Accordingly, when the flap 242 is positioned so as to block the mouth of the first branch 204 (as shown in FIG. 13), the exhaust gas stream is directed along the second branch 206, such that NOx may be removed from the exhaust gas stream by the LNT 220. Conversely, when the flap 242 is positioned so as to block the mouth of the second branch 206, the exhaust gas stream is directed along the first branch 204, such that NOx may be removed from the exhaust gas stream by the SCR catalyst 212.

With the above-described configuration, it is possible to select the most appropriate method for removing NOx from the exhaust gas stream. For example, in the event that the reagent tank 21 is empty, the exhaust gas stream can be directed along the second branch 206 so that NOx is removed using the LNT 220. Alternatively, during a regeneration event of the LNT 220, the exhaust gas stream may be directed along the first branch 204 so that NOx is removed using the SCR catalyst 212.

The flap valve 240 may be a bipolar valve, such that the flap 242 always blocks one of the first and second branches 204, 206. Alternatively, the flap valve 240 may be operable such that the flap 242 can be positioned midway between these positions such that the exhaust gas stream is directed along both the first and second branches 204, 206. In this case, since both the SCR catalyst 212 and the LNT 220 are operable to remove NOx from the exhaust gas stream, each of these components may be constructed with a smaller size than would otherwise be required. In another embodiment, the position of the flap valve 240 may be modulated to adjust the proportion of exhaust gas that passes down the first or second passage.

Figure 14:
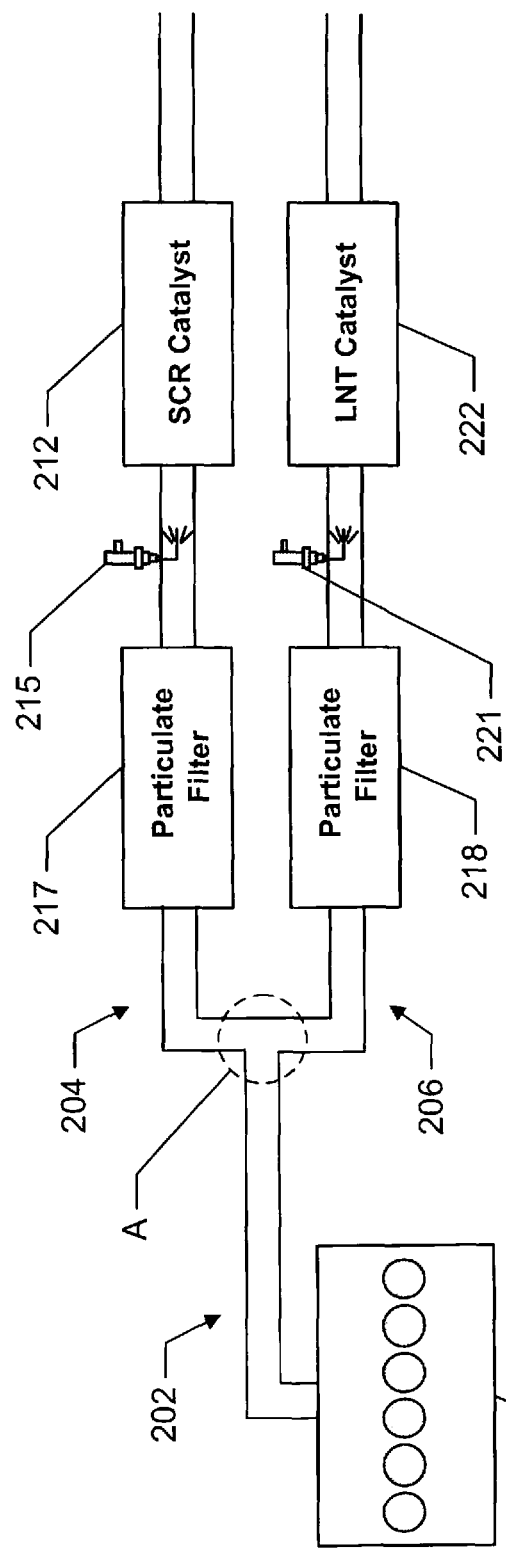
FIG. 14 shows a sixth exhaust system comprising an SCR dosing system according to the present invention.

Referring to FIG. 14, the exhaust system is similar to that of FIG. 11, with the exception that that the second branch 206 comprises an HC doser 221 and a NOx adsorber or Lean NOx Trap (LNT) 222, rather than the second SCR doser 216 and second SCR catalyst 214. The HC doser 221 is disposed upstream of the LNT 222, in order to inject HC into the exhaust gas stream flowing in the second branch 206 so as to regenerate the LNT 222. Accordingly, the exhaust system may be provided with a flap valve 240 of the kind shown in FIG. 13, and may operate in the same way as the embodiment shown in FIG. 12.

Figure 15:
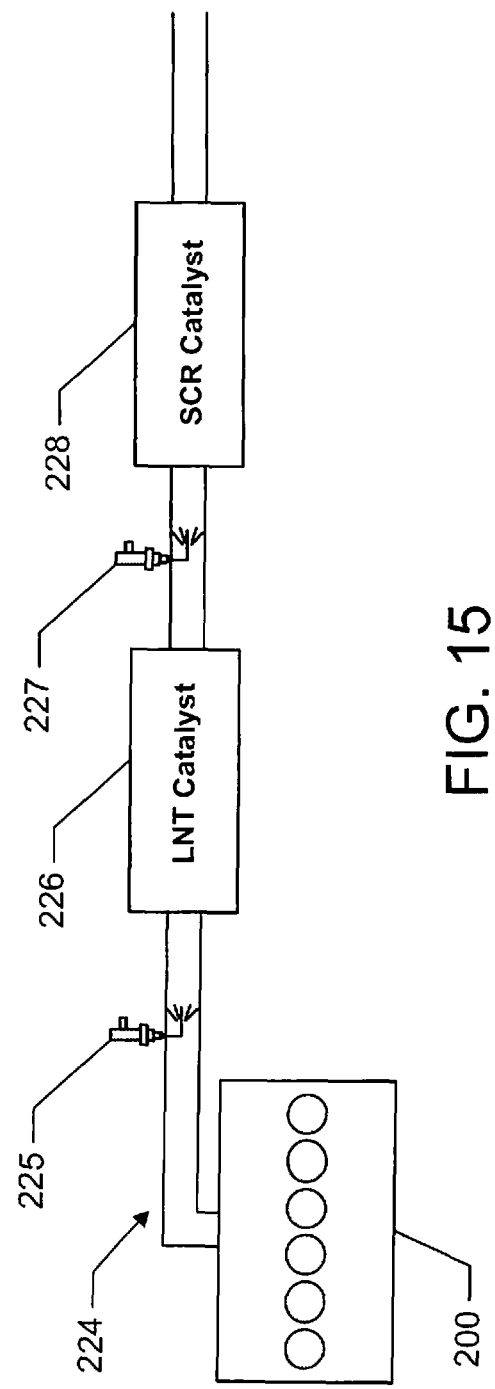
FIG. 15 shows an example of an exhaust system comprising an SCR dosing system, by way of background to FIG. 16.

Referring to FIG. 15, an exhaust system comprises a single branch 224 having an HC doser 225, an LNT 226, an SCR doser 227 and an SCR catalyst 228. The HC doser 225 is disposed upstream of the LNT 226, in order to inject HC into the exhaust gas stream so as to regenerate the LNT 226. The SCR doser 227 is disposed downstream of the LNT 226, and the SCR catalyst 228 is disposed downstream of the SCR doser 227. With this configuration remediation of NOx in the exhaust gas stream may be improved at lower operating temperatures, e.g. following engine start. More specifically, the LNT 226 is operable to trap NOx in the exhaust gas stream before the SCR 228 catalyst reaches its normal operating temperature of about 200° C. Accordingly, at a temperature of, for example, 150° C., NOx is removed from the exhaust gas stream by the LNT 226, resulting in lower NOx emissions from the exhaust system than could be achieved using the SCR catalyst 228 alone.

Another advantage of the above-described configuration is that the LNT 226 can be used to produce $NH_3$. Accordingly, the $NH_3$ produced by the LNT 226 can supplement the reagent injected by the SCR doser 227 in order to remediate NOx in the SCR catalyst 228. Thus, it is possible to reduce the amount of reagent which is required to be injected by the SCR doser 227. Further details of ammonia generation techniques can be found in our co-pending US patent applications US-2007-0065354 and US-2007-0271908.

Figure 16:
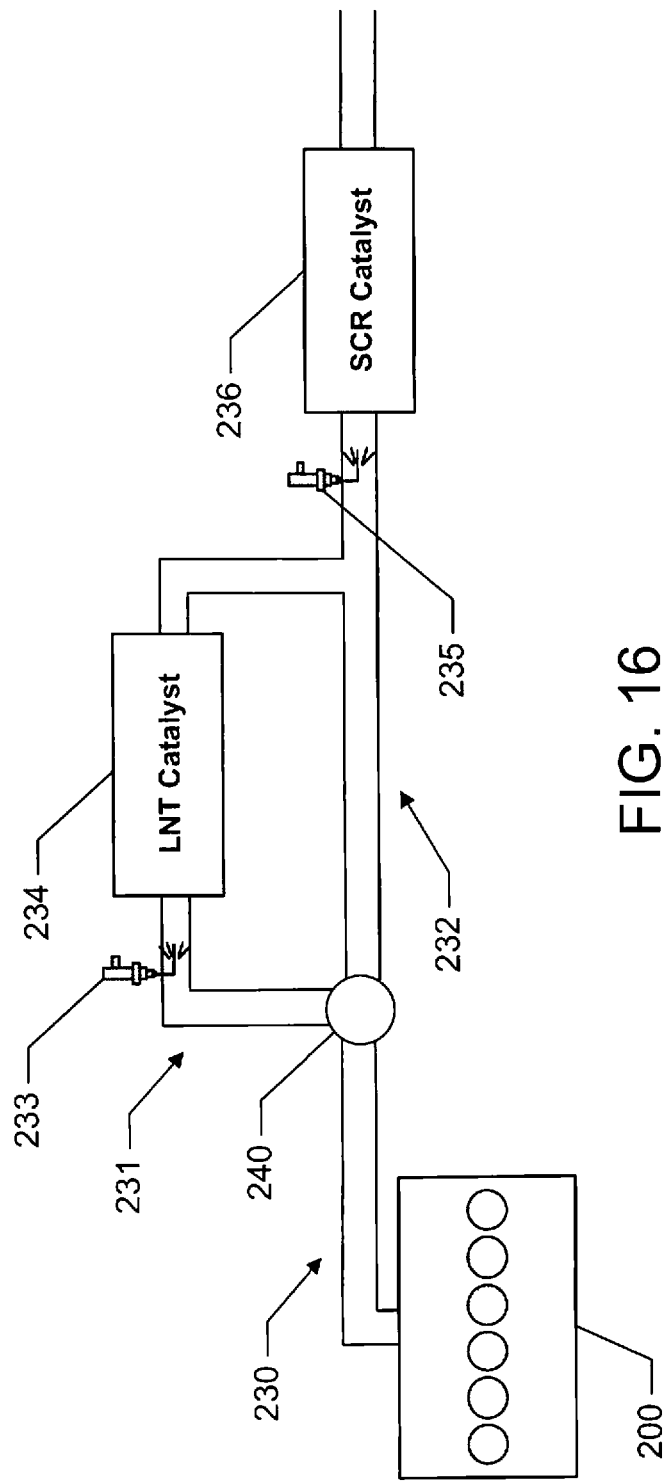
FIG. 16 shows a seventh exhaust system comprising an SCR dosing system according to the present invention.

Referring to FIG. 16, the exhaust system comprises a common exhaust portion, 230, which divides into a first branch 231 and a second branch 232. A 3-way valve 240 of the type described with reference to FIG. 13 is disposed at the intersection between the common exhaust portion, the first branch and the second branch.

The first branch 231 comprises an HC doser 233 and an LNT 234 disposed downstream of the HC doser 233. The second branch 232 comprises an SCR doser 235 and an SCR catalyst 236 disposed downstream of the SCR doser 235. A downstream end of the first branch 231 intersects with the second branch 232 at a point upstream of the SCR doser 235 and downstream of the valve 240, such that the exhaust gas stream in the first branch 231 can flow into the second branch 232.

The valve 240 is operable to direct the exhaust gas stream flowing in the common exhaust portion 230 into an upstream end of either the first branch 231 or the second branch 232 or, optionally, into the first and second branches 231, 232.

In the case that the valve 240 directs the exhaust gas stream into the first branch 231 only, the exhaust gas flows through the LNT 234 into the second branch 232 and through the SCR catalyst 236. Accordingly, as described previously with reference to the embodiment shown in FIG. 15, this arrangement has the advantage that NOx may be removed by the LNT 234 before the SCR catalyst 236 has reached its normal operating temperature. Additionally, $NH_3$ produced by the LNT 234 can be used to supplement the reagent injected by the SCR doser 235.

In the case that the valve 240 directs the exhaust gas stream into the second branch 232 only, the exhaust gas flows only through the SCR catalyst 236. With this configuration, when the SCR catalyst has warmed up to its normal operating temperature the LNT 234 may not be required and the exhaust gas can be directed through the SCR catalyst 236 only. Alternatively, during regeneration of the LNT 234 when the HC doser is injecting, it may be required that the exhaust gas stream is directed along the second branch 232 only.

Figure 17:
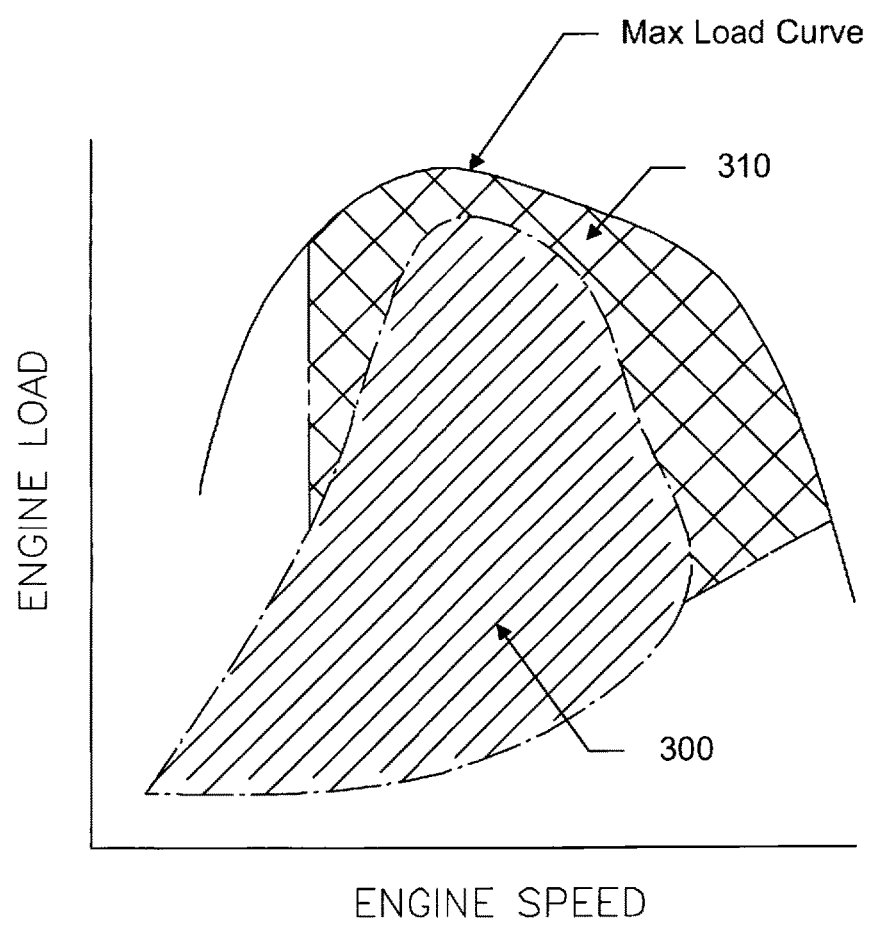
FIG. 17 is a graph of engine load versus engine speed and shows a thermal management zone.

Referring to FIG. 17, in order to comply with legislation, NOx emissions must be controlled over a specified driving/emissions test cycle or emissions zone 300. The emissions zone 300 covers a range of engine loads and engine speeds. Accordingly, the SCR dosing system 1 must be operational across the emissions zone 300. When operating at high load conditions, beyond the zone covered by the test cycle, reagent dosing is not strictly required and in the interests of minimizing reagent consumption, the vehicle calibrator may elect to stop dosing even though NOx is being generated by the engine and released to the atmosphere. The above-described SCR injector module 40 employs a thermal management means including an insulated sleeve for the dispenser 42 where it enters the exhaust system 7. This beneficial insulation arrangement is sufficient to ensure that additional dosing across the emissions zone for cooling purposes is not required. Nevertheless, when operating at high load, exhaust temperatures may be in excess of 500° C. and extended time at this condition will overwhelm the insulating measures for the dispenser 42 causing the aqueous urea to dry out and clog the dispenser 42 with precipitated salts.

In an embodiment of the present invention, the DCU 70 controls the injector module 40 to perform intermittent or sporadic injections of reagent under high load conditions, even though the calibration does not specifically require such dosing. Accordingly, the insulated connecting pipe 43 between the metering pump 41 and the dispenser 42 may be kept clear and cool by the intermittent flow of reagent. A specific feature of the solenoid-operated positive displacement pump is that the injection pressure is significantly higher than that from known dosing systems. Thus, in the case of the present invention, the metering pump 41 is able to force fresh reagent through the precipitated salts such that dosing performance may be maintained under conditions that would defeat prior art systems.

In one aspect of the present invention, when operating in a thermal management zone 310, which is a speed/load zone that is both outside and of higher load than that covered by the emissions cycle 300, and where the normal calibration may call for no or a severely restricted reagent dosing schedule, a flow management regime is employed in which the dosing schedule is based upon either measured or estimated exhaust gas temperature in the vicinity of the reagent atomizer rather than upon the normal NOx reduction strategy. Thus, the higher the exhaust gas temperature adjacent the dispenser 42, the higher the metering pump actuation repetition rate, with the rate being determined during development by the ability of the injection module 40 to maintain correct function as soon as the load returns into the emissions cycle regime. During this flow management regime, the dosing rate is significantly lower than that during the emissions cycle regime since the target is to prevent dry-out and clogging of the atomizer and not necessarily to keep NOx emissions within the legislated levels.

Typically, during the emissions cycle 300, the dosing frequency is between 0 and 100 Hz, and usually around 100 Hz, and is determined by the SCR catalyst temperature and the $NH_3$ loading. The optimum dosing rate is determined by the engine NOx production, which in turn relates to engine load. In thermal management zone 310, the dosing frequency is typically between 0 and 20 Hz and is determined substantially by the exhaust temperature. At these relatively high frequencies (typically 20-100 Hz), dosing is therefore fairly continuous but with a variable frequency depending on engine load (lower frequency at light load, higher frequency as high load) and whether the engine is running in the emissions cycle 30 or in the thermal management zone 310. It will be appreciated that even while dosing in the thermal management zone 310, there will also be some impact on NOx reduction across the SCR catalyst, but to a much lower extent than during the normal emissions cycle 300.

Figure 18:
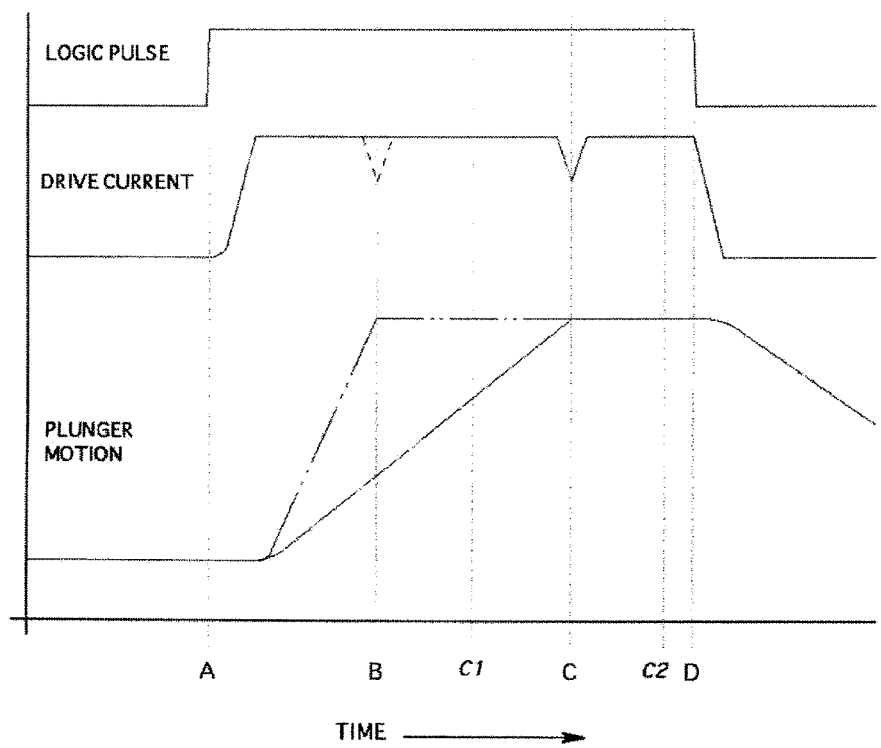
FIG. 18 shows logic pulse, drive current and plunger motion for an injector module of an SCR dosing system of the present invention.

Furthermore, the above-described flow management regime may be conveniently combined with a glitch detection strategy, wherein glitch detection is used to distinguish valid from non-valid pumping strokes. More specifically, referring to FIG. 18, rather than use exhaust temperature as an input as described above, the "time slope" of the pumping event may be monitored. Accordingly, as the dispenser 42 begins to clog, the time interval from energization to glitch detection will increase as it becomes harder to displace a shot of reagent. As a predetermined time limit is approached, the control algorithm increases the repetition rate to maintain a free-flowing duct.

Legislative bodies, such as the United States Environmental Protection Agency, may prescribe a maximum number of engine restarts which are permitted after the reagent tank runs dry, e.g. <20 engine restarts. Under these circumstances, it would not be possible to implement the above-described strategy with a dry tank. Accordingly, regular dosing may be stopped just prior to exhaustion of the tank so that the remaining contents of the tank can be used for the above thermal management strategy as necessary.

Additionally, the thermal management strategy may be linked with DPF regeneration events that also generate very high exhaust temperatures upstream of the injection module. For example, when the DCU determines that a DPF regeneration is taking place, the reagent can be under-dosed on the basis that it will be necessary to over-dose later in the event when temperatures are higher, whilst always trying to avoid ammonia slip from the SCR catalyst.

An objective of the total SCR system of which the reagent dosing system 1 is a part, is to maximize NOx conversion into harmless gases as efficiently as possible, particularly over the transient emissions driving cycle. Due to catalyst limitations, this conversion can only take place over the substrate temperature range of circa 180 to 450° C., but these conditions cover most of the engine operating range in terms of speed and load. Nevertheless, in covering this range, there is a wide variation in exhaust gas space-velocity at the reagent entry point into the exhaust system 7. The purpose of the dispenser 42 is to mix the reagent with the exhaust gas stream as homogeneously as possible so that it hydrolyses as rapidly as possible and the resulting NH3 is deposited across the face of the SCR catalyst 13 as uniformly as possible. If this objective is achieved, then the necessary mixing length can be shorter than would otherwise be the case and, due to the more efficient utilization, the SCR catalyst 13 may be smaller also. Both outcomes are highly desired.

However, a dispenser whose spray characteristics (in terms of droplet size and momentum) have, for example, been optimized for a moderate exhaust temperature and space-velocity will under-penetrate and be too easily deflected to achieve uniform mixing at other engine conditions that may provide a high space velocity, and vice versa. Therefore it is desirable to obtain a good match between the spray characteristics and the exhaust flow conditions across the operating range of the engine.

In an embodiment of the present invention, the above objective is achieved through the use of a "smart" actuator drive circuit. As explained previously, drive current glitch detection may be used to establish the time interval between the start of energization and the completion of a full and valid pumping stroke of the plunger 58. Assuming normal hydraulic conditions, i.e. free-flowing reagent with the supply line 35 not frozen or clogged, then the time to achieve a valid stroke will, to a large extent, depend on the energy that is expended by the actuator during the pumping event. Likewise there will be a relationship between the energy delivered by the actuator to the metering pump 41 and the reagent injection pressure generated at the nozzle valve 64, and in turn between the injection pressure and the droplet size and the momentum imparted to the spray. Therefore, by increasing or decreasing the drive current waveform it becomes possible to influence the spray momentum and thus provide flexibility in matching reagent spray characteristics to the prevailing exhaust gas space-velocity.

Thus, in use, it is proposed to vary the drive current level as a function of exhaust gas space velocity, the latter value being derived from an engine speed/load map or from an engine model, with higher drive current being provided at times of higher space velocity and vice versa. Variation of the drive current may be achieved using a voltage-chopped drive whereby the voltage chop frequency controls the resultant current level; a lower chop frequency results in higher drive current, and vice versa. However, changing the actuator drive current level also changes the time interval between actuator energization and detection of the valid stroke current glitch; a lower drive current will result in a longer elapsed time for completion of a valid stroke, and vice versa. This means that the "valid stroke window" will also need to change with the current level. Further details of this glitch detection technique can be found in our co-pending U.S. patent application Ser. No. 10/879,210.

One of the potential problems of the solenoid operated pump concept is the issue of noise generated by the armature 61 striking the lift-stop at either end of its stroke. Again, the smart drive box may be used to ameliorate this problem. Employing the glitch-detect feature, it becomes possible to use an adaptive algorithm to estimate the timing of the glitch event and then turn off the drive current just prior to end-of-stroke so that a full and valid stroke is obtained but with a soft landing of the armature 61. Likewise, on the spring-biased return stroke, a soft landing can be arranged with a short duration drive pulse that is timed to arrest its landing velocity.

The present invention is particularly suitable for use with light duty vehicles with compression ignition (diesel) engines. However, it will be appreciated by those skilled in the art that the present invention may equally be applied to other lean-burn engines operating on various fuels, such as gasoline, since they too may utilize SCR technology.

It will be appreciated by those skilled in the art that there is more than one NOx-reducing catalyst/reagent combination. While urea SCR is currently favoured for automotive use due to its favourable conversion ratio versus catalyst temperature performance, other combinations such as HC (hydrocarbon) SCR may equally be performed by an SCR dosing system according to the present invention.

The invention claimed is:
1. A reagent dosing system for dosing a reagent into the exhaust gas stream of an internal combustion engine, the system comprising:
   a reagent tank for storing a supply of reagent;

an injector module comprising an atomising dispenser and a positive-displacement metering pump which draws reagent from the reagent tank and delivers it to the dispenser;

a supply line coupling the reagent tank to the injector module;

a dosing control unit operable to control the injector module to inject reagent into the exhaust gas stream; and an additional priming pump arranged, in use, to urge reagent along the supply line toward the injector module under selected conditions.

2. A system according to claim 1, wherein the dispenser and the metering pump are integrated within the same unit.

3. A system according to claim 1, wherein the priming pump is operable at or during a start-up mode.

4. A system according to claim 1, wherein the priming pump is operable continuously or intermittently during running of the engine.

\* \* \* \* \*